(12) United States Patent
Berkowitz et al.

(10) Patent No.: US 8,580,711 B2
(45) Date of Patent: Nov. 12, 2013

(54) DECREASING OR PREVENTING SUB-SURFACE GEOLOGICAL MATTER CONTAMINATION BY AGROCHEMICALS

(75) Inventors: Brian Berkowitz, Mazkeret Batia (IL); Ishai Dror, Shoham (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 1307 days.

(21) Appl. No.: 12/084,555

(22) PCT Filed: Nov. 9, 2006

(86) PCT No.: PCT/IL2006/001293
§ 371 (c)(1),
(2), (4) Date: May 5, 2008

(87) PCT Pub. No.: WO2007/054937
PCT Pub. Date: May 18, 2007

(65) Prior Publication Data
US 2009/0227462 A1  Sep. 10, 2009

Related U.S. Application Data

(60) Provisional application No. 60/735,167, filed on Nov. 10, 2005, provisional application No. 60/750,333, filed on Dec. 15, 2005.

(51) Int. Cl.
*A01N 25/00* (2006.01)

(52) U.S. Cl.
USPC ........................................................ 504/358

(58) Field of Classification Search
None
See application file for complete search history.

(56) References Cited

U.S. PATENT DOCUMENTS

| 5,645,374 A * | 7/1997 | Lesage et al. ............ 210/747.8 |
| 2009/0159539 A1 | 6/2009 | Berkowitz et al. |
| 2009/0227462 A1 | 9/2009 | Berkowitz et al. |

FOREIGN PATENT DOCUMENTS

| WO | WO 03/080576 | 10/2003 |
| WO | WO 03080576 A2 * | 10/2003 |
| WO | WO 2007/054936 | 5/2007 |

OTHER PUBLICATIONS

Marks et al., App Environ Microbiol 55: 1258 (1989).*

(Continued)

*Primary Examiner* — James H Alstrum Acevedo
*Assistant Examiner* — Thor Nielsen

(57) ABSTRACT

Method of exposing agricultural substrates (plant matter 10, animal matter 12) to agrochemicals (A); method of decreasing or preventing sub-surface geological matter (20, 22) contamination resulting from exposing agricultural substrates to agrochemicals; composition [(A)/(T)] 30 used therein; article-of-manufacture including the composition. Includes exposing agricultural substrates to composition including combination (mixture) of an agrochemical and at least one transforming agent capable of decreasing or eliminating concentration of the agrochemical which contacts sub-surface geological matter (at temporally varying times, and at spatially varying depths). Before entering sub-surface geological matter, transforming agent exhibits inactivity for decreasing agrochemical concentration, and inactivity for affecting or/and interfering with agrochemical functionality with respect to agricultural substrates. Transforming agent co-migrates and is co-distributed with agrochemical within and throughout sub-surface geological matter, and exhibits activity for decreasing or eliminating agrochemical concentration therein. Transforming agent activity is exhibited at spatially varying depths, at temporally varying times, within sub-surface geological matter.

36 Claims, 1 Drawing Sheet

(56) References Cited

OTHER PUBLICATIONS

Obare et al., 226th ACS National Meeting, 193 (2003).*
Garrison et al. Environ Sci Technol 34: 1663 (2000).*
Wahid et al., Nature 282, 401 (1979).*
International Preliminary Report on Patentability Dated Jan. 22, 2009 From the International Bureau of WIPO Re.: Application No. PCT/IL2006/001292.
International Preliminary Report on Patentability Dated Jan. 22, 2009 From the International Bureau of WIPO Re.: Application No. PCT/IL2006/001293.
Duke et al. "Photosensitizing Prophyrins as Herbicides", ACS Symposium Series, Nature Occuring Pest Bioregulation, 449: 371-386, 1991. CAPLUS, Accession No. 1991:180218.
Translation of Office Action Dated Sep. 21, 2010 From the State Intellectual Property Office of the People's Republic of China Re. Application No. 200680050749.0.
Office Action Dated Jan. 10, 2012 From the Israel Patent Office Re. Application No. 191109 and Its Translation Into English.
Examiner's Report Dated Jul. 20, 2011 From the Australian Government, IP Australia Re. Application No. 2006313381.
Translation of Office Action Dated Jul. 12, 2011 From the State Intellectual Property Office of the People's Republic of China Re. Application No. 200680050660.4.
International Search Report and the Written Opinion Dated Jul. 22, 2008 From the International Searching Authority Re. Application No. PCT/IL06/01292.
Translation of Office Action Dated Aug. 3, 2012 From the State Intellectual Property Office of the People's Republic of China Re. Application No. 200680050660.4.
Translation of Search Report Dated Aug. 3, 2012 From the State Intellectual Property Office of the People's Republic of China Re. Application No. 200680050660.4.
Examiner's Report Dated Jun. 18, 2010 From the Australian Government, IP Australia Re. Application No. 2006313380.

* cited by examiner

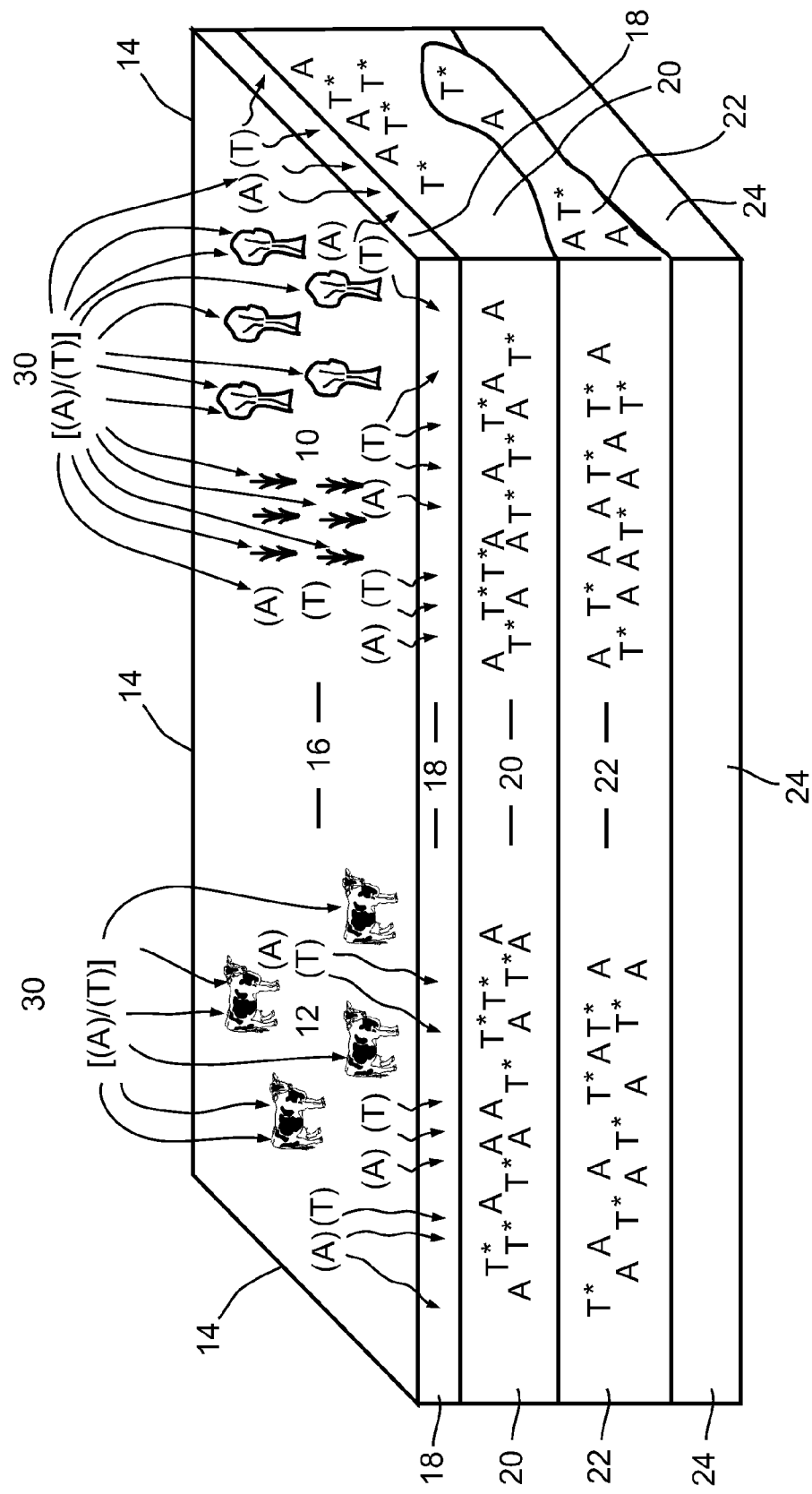

US 8,580,711 B2

DECREASING OR PREVENTING SUB-SURFACE GEOLOGICAL MATTER CONTAMINATION BY AGROCHEMICALS

RELATED APPLICATIONS

This Application is a National Phase of PCT Patent Application No. PCT/IL2006/001293 having International filing date of Nov. 9, 2006, which claims the benefit of U.S. Provisional Patent Application No. 60/735,167 filed on Nov. 10, 2005 and of U.S. Provisional Patent Application No. 60/750,333 filed on Dec. 15, 2005. The contents of the above Applications are all incorporated herein by reference.

FIELD AND BACKGROUND OF THE INVENTION

The present invention relates to the field of environmental science and technology focusing on decreasing or preventing sub-surface geological matter (e.g., ground or earth, or/and water) contamination by agrochemicals. More particularly, the present invention relates to a method of exposing an agricultural substrate (plant matter, animal matter) to an agrochemical, and to a method of decreasing or preventing sub-surface geological matter contamination resulting from exposing an agricultural substrate to an agrochemical. The present invention further relates to a composition used in those methods, and to an article-of-manufacture including the composition.

Agricultural Substrates:

Herein, with respect to the field and art of the present invention, an 'agricultural substrate' is to be understood as generally being any plant matter or animal matter that is cultivated, bred, raised, grown, developed, maintained, or/and stored, as part of an agricultural process or agricultural type of process. In a non-limiting manner, an agricultural substrate is also to be understood as generally being any plant matter or animal matter that is cultivated, bred, raised, grown, developed, maintained, or/and stored, as part of a process involving or/and relating to, agronomy (i.e., scientific agriculture), horticulture (i.e., art and science of growing flowers, fruits, vegetables, and shrubs, especially in gardens or orchards), botany (i.e., art and science of plants), zoology, marine biology, among other fields, which are either known, or may be considered, as being related or connected to the field of agriculture.

Plant matter is to be understood as generally being any number and type of plant entity, structure, substance, or material, which is in some stage of being cultivated, bred, raised, grown, developed, maintained, or/and stored, as well as to any number and type of plant entity, structure, substance, or material, which may be, or has been, harvested or cut. Harvested or cut plant matter is to be understood as generally being plant matter which has been entirely or wholly separated, detached, or removed, from the soil or earth hosting the plant matter. Such separating, detaching, or removing, of the plant matter is performed by pulling or/and cutting the plant matter out of, or out from, the soil or earth hosting the plant matter, at the point or location of cultivating, breeding, raising, growing, or developing, of the plant matter, such that the harvested plant matter is no longer considered plant matter that is actively cultivated, bred, raised, grown, or developed. In a non-limiting manner, exemplary types of plant matter which are particularly relevant to the field and art of the present invention are crops, plants, trees, bushes, shrubs, vines, flowers, and weeds. Exemplary types of plant matter which are especially relevant to the field and art of the present invention are commercial grain, vegetable, or fruit, types of crops or plants, and, flowers.

Animal matter is to be understood as generally being any number and type of animal entity, structure, substance, or material, which is living and in some stage of being bred, raised, grown, developed, maintained, or/and stored, as well as to any number and type of animal entity, structure, substance, or material, which may become, or is, non-living as a result of being slaughtered (typically, as a source of human consumable meat, poultry, or fish). In a non-limiting manner, exemplary types of animal matter which are particularly relevant to the field and art of the present invention are livestock, farm animals, zoo animals, marine animals, and sheltered animals. Exemplary types of animal matter which are especially relevant to the field and art of the present invention are commercial livestock, farm animals, and marine animals, such as cattle (cows), sheep (lamb), hogs (pigs), goats, oxen (steer), horses, chickens, turkeys, and fish.

Agrochemicals:

Herein, with respect to the field and art of the present invention, an 'agrochemical' is to be understood as generally being any chemical, biological, or/and physical, entity, structure, substance, material, compound, composition, formulation, or organism, singly or in combination, which is applied or dispensed to, or/and upon, the outer (air or atmosphere exposed) surface of an agricultural substrate (as defined hereinabove) or/and immediately surrounding environment of an agricultural substrate, as part of cultivating, breeding, raising, growing, developing, maintaining, or/and storing, the agricultural substrate.

A first main category of agrochemicals particularly relevant to the field and art of the present invention includes agrochemicals that promote or/and enhance cultivating, breeding, raising, growing, developing, maintaining, or/and storing, of agricultural substrates, in a positive manner (i.e., with respect to the agricultural substrates). Exemplary sub-categories of agrochemicals included in this first main category of agrochemicals are fertilizers, growth stimulators, plant growth regulators (those which 'positively' promote or/and enhance plant growth and development), hormones, synergists, and similar types of agrochemicals, which are applied or dispensed to, or/and upon, the outer surface or/and immediately surrounding environment of plant matter types of an agricultural substrate, as part of cultivating, breeding, raising, growing, developing, maintaining, or/and storing, the plant matter, in a positive manner (i.e., with respect to the plant matter).

A second main category of agrochemicals particularly relevant to the field and art of the present invention includes agrochemicals that promote or/and enhance cultivating, breeding, raising, growing, developing, maintaining, or/and storing, of agricultural substrates, in a negative or inhibitory manner (i.e., against 'enemies' of the agricultural substrates). An important exemplary sub-category of agrochemicals in this second main category of agrochemicals is pesticides, which are applied or dispensed to, or/and upon, the outer surface or/and immediately surrounding environment of plant matter or animal matter types of an agricultural substrate, as part of cultivating, breeding, raising, growing, developing, or maintaining, the plant matter or animal matter, in a negative or inhibitory manner (i.e., against enemy 'pests' of the plant matter or animal matter).

A pesticide, as an important exemplary sub-category of agrochemicals, is commonly known as generally being any chemical that is used to kill pests, such as insects, and rodents. Herein, in a more encompassing and general manner, which is particularly relevant to the field and art of the present invention, a pest may be considered as essentially any living plant or animal organism, or any microorganism, which interferes with or/and inhibits cultivating, breeding, raising, growing, developing, maintaining, or/and storing, of agricultural substrates (plant matter, animal matter). Pesticides may be divided and classified into major groups [1]. Major pesticide groups are: acaricides or miticides (lethal to ticks and mites), algicides, antifeedants, avicides (lethal to birds), bactericides, bird repellants, chemosterilants, fungicides, herbicide safeners, herbicides, insect attractants, insect repellants, insecticides, mammal repellants, mating disrupters, molluscicides, nematicides, plant activators (activate plant defense mechanisms against pests), plant growth regulators (those which inhibit pest plant growth), rodenticides, synergists, and virucides. This classified list of major pesticides groups represents at least fourteen hundred pesticide compounds. Moreover, each major pesticide group is sub-divided into chemical or other classes.

Geological Matter and Sub-Surface Geological Matter:

Herein, with respect to the field and art of the present invention, 'geological matter' is to be understood as generally being a type of ground or earth, or/and water. A given geological matter can be generally characterized as being inorganic, organic, non-aqueous, aqueous, or any combination thereof. In general, there exist various different forms of a ground or earth type of geological matter, and various different forms of a water type of geological matter.

Exemplary specific forms of a ground or earth type of geological matter which are particularly relevant to the field and art of the present invention are soil, sand, rocks, stones, pebbles (i.e., small rocks or stones), sediment (i.e., matter deposited by water or wind), fragments thereof, or any combination thereof (e.g., gravel, being an unconsolidated combination (mixture) of rock fragments or pebbles).

Exemplary specific forms of a water type of geological matter which are particularly relevant to the field and art of the present invention are water that is, or/and may be, present or contained in, typically naturally existing, but possibly human made, rivers, streams, lakes, ponds, pools, water reservoirs, wells or springs (i.e., flows of water from the ground or earth), ground water, and aquifers. Additional exemplary specific forms of water which are also relevant to the field and art of the present invention are water that is, or/and may be, present or contained in human made (commercial size) large volume water receiver, collection, or/and storage, vessels, containers, reservoirs, or chambers.

'Sub-surface geological matter' is to be understood as generally being any geological matter, as just defined, but limited to only that entire, or to only that part of, geological matter which is located below or beneath the top or uppermost surface layer of a form of ground or earth, or of a form of water. Accordingly, sub-surface geological matter is a particular or special case of the more general geological matter.

For example, within an agricultural or agricultural type of field or plot of land, plant matter and animal matter types of agricultural substrates are physically located and function (i.e., they exist by breathing, eating, etc.) upon the air or atmosphere exposed surface of the top or uppermost surface layer of ground or earth. In contrast to animal matter, plant matter, in particular, due to the presence of a depth dependent 'living' plant root system and associated plant roots, is also partly physically located and functions (exists) within and throughout such a top or uppermost surface layer. Accordingly, such a top or uppermost surface layer is ordinarily characterized by including within and throughout it a living plant root system and associated plant roots, and can therefore be classified, and equivalently referred to, as a plant matter root layer.

All geological matter which is located below or beneath the top or uppermost surface layer (i.e., the plant matter root layer) of ground or earth is collectively considered as sub-surface geological matter. Thus, geological matter which is contained upon the air or atmosphere exposed surface of the top or uppermost surface layer (i.e., the plant matter root layer) of ground or earth, as well as geological matter which is contained within and throughout the top or uppermost surface layer (i.e., the plant matter root layer) of ground or earth, are not considered as sub-surface geological matter.

The depth of the top or uppermost surface layer (i.e., the plant matter root layer) of ground or earth which extends from immediately below or beneath the air or atmosphere exposed surface to immediately above what is considered sub-surface geological matter, clearly varies, and primarily depends upon the type or kind, and, properties, characteristics, and behavior, of plant matter, in particular, regarding the living plant root system and associated plant roots which are located and function (exist) within and throughout the top or uppermost surface layer (i.e., the plant matter root layer). This depth also depends upon the type or kind, and, properties, characteristics, and behavior, of geological matter which is contained upon the air or atmosphere exposed surface, and upon the type or kind, and, properties, characteristics, and behavior, of geological matter which is contained within and throughout the top or uppermost surface layer (i.e., the plant matter root layer) of ground or earth.

Typically, this depth from immediately below or beneath the air or atmosphere exposed surface to immediately above what is considered sub-surface geological matter, extends in a range of between about 5 centimeters and about 1.5 meters. Clearly, this depth proportionately increases for proportionately larger plant matter types of agricultural substrates which have correspondingly proportionately larger and deeper living plant root systems and associated plant roots located and functioning (existing) within and throughout the top or uppermost surface layer (i.e., the plant matter root layer) of ground or earth. It is noted that within and throughout this depth, although below or beneath the air or atmosphere exposed surface of ground or earth which hosts plant matter and animal matter types of agricultural substrates, that agrochemicals also function as part of cultivating, breeding, raising, growing, developing, maintaining, or/and storing, the agricultural substrates, especially with respect to the plant matter root layer of plant matter.

As previously stated hereinabove, all geological matter which is located below or beneath the top or uppermost surface layer of a form of ground or earth, or of a form of water, is considered as sub-surface geological matter. Exemplary specific forms of a ground or earth type of sub-surface geological matter are soil, sand, rocks, stones, pebbles (i.e., small rocks or stones), sediment (i.e., matter deposited by water or wind), fragments thereof, or any combination thereof (e.g., gravel, being an unconsolidated combination (mixture) of rock fragments or pebbles). Exemplary specific forms of a water type of sub-surface geological matter are water that is, or/and may be, present or contained in, typically naturally existing, but possibly human made, 'sub-surface' rivers, streams, lakes, ponds, pools, and water reservoirs. Additional exemplary specific forms of such water type of geological matter are water that is, or/and may be, present or contained in human made (commercial size) 'sub-surface' large volume water receiver, collection, or/and storage, vessels, containers, reservoirs, or chambers.

Ground water (i.e., water found underground beneath the earth's surface within partially or fully saturated soil or/and permeable (e.g., porous) rock), and water of an aquifer (i.e., a water-bearing rock or rock formation, or an underground layer of permeable (porous) rock, sand, etc., containing water), are special cases of sub-surface geological matter, wherein, for each of these forms of water, all of the water is 'entirely' located below or beneath the top or uppermost surface layer of a form of ground or earth.

As indicated hereinabove, sub-surface geological matter begins at, or from, a depth in a range of between about 5 centimeters and about 1.5 meters below or beneath the air or atmosphere exposed surface of the top or uppermost surface layer of ground or earth, or of water. Moreover, sub-surface geological matter can extend until a depth of several hundreds of meters, and even to a depth of more than 1000 meters, below or beneath the air or atmosphere exposed surface of the top or uppermost surface layer of ground or earth, or of water.

Herein, the term 'geological matter' is to be understood as defined hereinabove, and thus, in a general manner, may include reference to sub-surface geological matter, unless otherwise specifically stated herein. However, the term 'sub-surface geological matter' is to be understood only as specifically just defined, that is, as a particular or special case of geological matter.

On-Going Problems Caused by Sub-Surface Geological Matter Contamination Resulting from Exposing Agricultural Substrates to Agrochemicals:

In agricultural or agricultural types of processes which involve applying or dispensing agrochemicals to, or/and upon, outer surfaces or/and immediately surrounding environments of plant matter or/and animal matter types of agricultural substrates, as part of cultivating, breeding, raising, growing, developing, maintaining, or/and storing, the agricultural substrates, the resulting distribution (pervasiveness), transport (mobility), and fate (i.e., as relating to persistence, degradation, transformation, or/and conversion), of the agrochemicals into the above stated types and forms of sub-surface geological matter has led to extensive contamination or pollution of the sub-surface geological matter.

Distribution, transport, fate, ecological risk, and health effects, of agrochemicals, and possible degradation, transformation, or/and conversion products thereof, in sub-surface geological matter, particularly, in the above stated water or aqueous forms of sub-surface geological matter, which are, or/and come in direct contact with, or/and lead to, sources of drinking water, are of great concern because of proven or potentially hazardous (poisonous or toxic) properties and characteristics of the resulting sub-surface geological matter contamination or pollution.

Largely based on the fact that ground water accounts for more than about 95% of the earth's usable fresh water resources, ground water contamination or pollution is a critical issue, and intensive efforts are continuously being invested in the development of improved and new technologies for treating or remediating sub-surface geological matter contaminated or polluted with agrochemicals.

Among the wide variety of different types of sub-surface geological matter contaminants or pollutants, agrochemicals, particularly those composed of, or which include, halogenated (especially, chlorinated) organic compounds, are arguably the most common, pervasive (widespread), persistent (e.g., having half-lives ranging from days to 10,000 years), proven or potentially hazardous (poisonous or toxic), undesirable contaminants or pollutants in the above stated types and various forms of sub-surface geological matter. Many such types and forms of sub-surface geological matter are, or/and come in direct contact with, or/and lead to, sources of drinking water. Currently, numerous halogenated (especially, chlorinated) organic compound types of agrochemicals are still applied in large quantities on large scales, in commercial agricultural and industrial processes, by exploiting their high performance, in addition to their relatively high stability and resistance to chemical and biological degradation. It is now recognized that these properties, which are essential to commercial agriculture and industry, have devastating effects on sub-surface geological matter environments, translating to undesirable short and long term human health problems.

Among the wide variety of different halogenated (especially, chlorinated) organic compound agrochemicals used in agricultural or agricultural types of processes which involve applying or dispensing to, or/and upon, outer surfaces or/and immediately surrounding environments of plant matter or/and animal matter types of agricultural substrates, as part of cultivating, breeding, raising, growing, developing, maintaining, or/and storing, the agricultural substrates, halogenated organic compound members in the above listed major pesticide groups are the most widely used. Within the major pesticide group of herbicides, three particularly well known halogenated organic herbicide sub-groups or classes are: the chlorotriazine herbicide sub-group or class, the chloroacetanilide herbicide sub-group or class, and the halogenated aliphatic herbicide sub-group or class. The well known chlorinated organonitrogen herbicides (CONHs) encompass all halogenated organic herbicide members (especially triazines, such as atrazine and cyanazine) in the chlorotriazine herbicide sub-group, and all halogenated organic herbicide members (such as alachlor and metolachlor) in the chloroacetanilide herbicide sub-group.

The popularity of using triazine halogenated organic herbicide type pesticides in commercial agriculture is based on their herbicidal effectiveness, commercial affordability, and lack of comparable commercial alternatives. Halogenated organic herbicide type pesticides, in general, and CONHs, in particular, are commonly used for pre- and post-emergence weed control during the growing of various crops, for example, corn, soybean, and sugarcane, and have become an integral component of modern commercial agriculture worldwide. The U.S. Environmental Protection Agency (EPA) estimates that 36 and 16 million kilograms of atrazine and cyanazine, respectively, are dispersed among farms and croplands annually across the nation [2]; application of alachlor tends to be similar to atrazine [3-5].

Halogenated organic herbicide type pesticides, in general, and CONHs, in particular, and many of their degradation products, are non-volatile particulate substances (nearly all) or liquids (some) which, at typical contaminant concentrations (e.g., ppb-ppm range) are soluble in water, and are mobile within and throughout permeable (porous) sub-surface geological matter (soil, sand, rocks, stones, pebbles, sediment, gravel), and of course, water. Many halogenated organic herbicide type pesticides, for example, the CONHs—atrazine, cyanazine, simazine, alachlor, and metolachlor, and their degradation products (especially higher water mobile halogen (typically, chlorine) containing derivatives), are pervasive, persistent, proven or potentially hazardous (poisonous or toxic), undesirable contaminants or pollutants of sub-surface geological matter, particularly, in the above stated water or aqueous forms of sub-surface geological matter, which are, or/and come in direct contact with, or/and lead to, sources of drinking water.

Halogenated organic herbicide type pesticides, in general, and CONHs, in particular, among other types of agrochemicals, have been measured in drinking water sources at concentrations exceeding their EPA promulgated maximum contaminant levels (MCLs) [3, 5, 6]. The possibility of widespread sub-surface geological matter contamination or pollution, and consequent deterioration of water quality, resulting from exposing agricultural substrates to agrochemicals, such as halogenated organic herbicide type pesticides, and subsequent runoff of the agrochemicals and their degradation products from agricultural fields into sub-surface geological matter, are driving the on-going need for studying about the distribution (pervasiveness), transport (mobility), fate (i.e., as relating to persistence, degradation, transformation, or/and conversion), ecological risk, and health effects, of agrochemicals, particularly halogenated (especially, chlorinated) organic compound agrochemicals, in sub-surface geological matter, particularly, in the above stated water or aqueous forms of sub-surface geological matter, which are, or/and come in direct contact with, or/and lead to, sources of drinking water.

The persistence of halogenated organic herbicide type pesticides, in general, and CONHs, in particular, and their degradation products, in sub-surface geological matter has been widely reported [e.g., 2, 7-12]. Studies [7, 8, 13-15] by the U.S. Geological Survey (USGS) have shown that some parent CONHs, particularly atrazine, persist from year to year in sub-surface geological matter, such as soils and rivers, and that several CONH degradates are likewise persistent and mobile. Atrazine has a half-life of about 125 days, and because atrazine is not readily absorbed or adsorbed by soil particles, it is relatively mobile among sandy soils, further enabling atrazine to contaminate or pollute sub-surface geological matter. For example, in the US, atrazine has been found in the ground water of all 36 river basins studied by the USGS, and the USGS estimates that persistence of atrazine in deep lakes may exceed 10 years. Similar findings were obtained for diethylatrazine, an atrazine degradation byproduct, and it was reported [2] that concentrations of the parent compounds atrazine, alachlor and cyanazine, were occasionally observed above their MCLs in the Minnesota River. Well water surveys [e.g., 9] have shown that many sub-surface aquifers are contaminated with high levels of CONHs.

Numerous studies [e.g., 9, 10, 12-15] clearly indicate the on-going concern regarding possible health effects due to the presence of CONHs and their degradation products in sub-surface geological matter, particularly, in the above stated water or aqueous forms of sub-surface geological matter, which are, or/and come in direct contact with, or/and lead to, sources of drinking water. Many CONHs show acute and chronic toxicities at low concentrations [16-18], and they generally are known, or are suspected, to be carcinogenic, mutagenic, or/and teratogenic [2, 16-20].

In various countries, such as the US and EU (European Union) countries, throughout the world, use of some agrochemicals, such as atrazine, has been either greatly restricted or entirely banned [21], and levels of such agrochemicals in drinking water have been governmentally regulated. Despite such restrictions, bans, or/and regulations, many agrochemicals, and their degradation products, remain as major proven or potentially hazardous (poisonous or toxic), water contaminants or pollutants. Moreover, because conventional water treatment practices ordinarily do not remove soluble agrochemicals from the raw source waters being treated, agrochemical concentrations in drinking water can be equivalent to those in the raw source waters [8, 22-24].

In spite of proven and potential environmental and health hazards, many agrochemicals currently remain in widespread international use, thereby perpetuating the above described on-going problems caused by sub-surface geological matter contamination or pollution resulting from exposing agricultural substrates to agrochemicals.

Techniques for Treating or Remediating Sub-Surface Geological Matter Contaminated with Agrochemicals:

Although not a technique per se for treating or remediating the above stated types and forms of sub-surface geological matter which are contaminated or polluted with agrochemicals, the concept or principle of 'natural attenuation' is currently practiced for attempting to achieve or accomplish such treatment or remediation. 'Natural attenuation' (NA) generally refers to the natural occurrence or taking place of any number of various different physical, chemical, or/and biological types of natural phenomena, mechanisms, and processes, for example, involving degradation, transformation, conversion, sorption (i.e., adsorption-desorption), among others, which under favorable conditions cause or lead to 'natural' reduction or attenuation of various quantifiable parameters or properties, such as mass, toxicity, mobility, volume, or/and concentration, of organic contaminants or pollutants in geological matter, in general, and in sub-surface geological matter, in particular.

Aside from the continued practice of 'natural attenuation', there are numerous different types of techniques (methods, materials, compositions, devices, and systems) for treating or remediating the above stated types and forms of geological matter, in general, which may include sub-surface geological matter, which are contaminated or polluted with various different types and kinds of organic compound contaminants or pollutants, including those which may either be, or include, agrochemicals.

Each particular technique is primarily based on principles, phenomena, mechanisms, and processes, in one of the following main categories: (a) physical/physical chemical, (b) biological, or (c) chemical. A common ultimate objective of each geological matter treatment or remediation technique is to in-situ or/and ex-situ eliminate, or at least decrease, concentrations of the hazardous or potentially hazardous (poisonous or toxic) organic compound contaminants or pollutants, and desirably, also their degradation products, in the contaminated or polluted geological matter.

Physical/physical chemical techniques for treating or remediating geological matter contaminated or polluted with organic compounds, such as agrochemicals, are based on exploiting physical or physicochemical types of phenomena, mechanisms, and processes, such as filtration, for absorbing, adsorbing, and removing, the organic compounds; chemical destruction, whereby extreme conditions of temperature or/and pressure are used for breaking chemical bonds of the organic compounds; or/and photolysis, whereby UV (ultraviolet) light is used for breaking chemical bonds of the organic compounds. The organic compounds are 'physically' or 'physicochemically' removed or transported from the contaminated geological matter to another medium, such as a filter, or are degraded, transformed, or/and converted, in the contaminated geological matter to non-hazardous or/and less hazardous (poisonous or toxic) compounds.

Biological techniques for treating or remediating geological matter contaminated or polluted with organic compounds, such as agrochemicals, are based on exploiting biological (microbiological) types of phenomena, mechanisms, and processes, involving the use of biological organisms (such as microbes, microorganisms, bacteria), for 'biologically' degrading, transforming, or/and converting, the organic compounds in the contaminated geological matter to non-hazardous or/and less hazardous (poisonous or toxic) compounds.

Chemical techniques for treating or remediating geological matter contaminated or polluted with organic compounds, such as agrochemicals, particularly, the above described halogenated (especially, chlorinated) organic compounds, are based on exploiting non-catalytic chemical reaction, or (homogeneous or heterogeneous) catalytic chemical reaction, types of phenomena, mechanisms, and processes, involving the use of (inorganic or/and organic) chemical reagents, for 'chemically' degrading, transforming, or/and converting, for example, via reductive dehalogenating, the halogenated organic compounds in the contaminated geological matter to non-hazardous or/and less hazardous (poisonous or toxic) compounds.

A first specific example of such a chemical technique is that disclosed in PCT Int'l. Pat. Appl. Pub. No. WO 2006/072944, published Jul. 13, 2006, by the present applicant. Therein is disclosed a new diatomite/ZVM (zero valent metal)/electron transfer mediator composite, a method for manufacturing thereof, a method using thereof, and a system including thereof, for (in-situ or ex-situ) heterogeneously catalytically treating contaminated water, wherein the contaminated water is a form of ground water, surface water, above surface water, vapor, or/and gas. The composite is composed of a powdered diatomite (kieselguhr) support or matrix (optionally, including vermiculite) on or/and into which are incorporated at least one (preferably, porphyrinogenic organometallic complex type of) electron transfer mediator functioning as a catalyst, and zero valent metal (ZVM) nanometer sized particles, for example, having a size in a range of between about 5 nm and about 600 nm, functioning as a bulk electron donor or reducing agent. The composite type of heterogeneous catalyst is used for heterogeneously catalyzing reductive dehalogenation (especially, dechlorination) reactions, that are applied for catalytically treating or remediating contaminated or polluted water which includes, for example, halogenated organic compounds, particularly, halogenated organic solvents, such as chlorinated organic solvents.

In the composite, exemplary zero valent metals (functioning as a bulk electron donor or reducing agent) are zero valent transition metals, such as zero valent iron, cobalt, nickel, copper, or/and zinc. Preferably, the electron transfer mediator (functioning as the main catalytically active component of the heterogeneous composite) is a porphyrinogenic organometallic complex, such as a metalloporphyrin, for example, a chlorophyll (magnesium (II) complex) or a heme (iron (II) complex), or/and, a metalloporphyrin-like complex, for example, the metallocorrin type of organometallic complex, vitamin $B_{12}$ (cyanocobalamin) (corrin ligand (a porphyrin analog) complexed to a cobalt (III) ion). For implementation, the heterogeneous composite is dispersed throughout the contaminated water under reducing (typically, anaerobic or anoxic) conditions, during which heterogeneous catalytic reductive dehalogenation reactions degrade, transform, or/and convert, the halogenated organic compounds in the contaminated water to non-hazardous or/and less hazardous compounds.

A second specific example of such a chemical technique is that disclosed in concurrently filed PCT patent application, entitled: "Catalytically Treating Water Contaminated With Halogenated Organic Compounds", also by the present applicant. Therein is disclosed a new method of catalytically treating water contaminated with halogenated organic compounds, and a system thereof, wherein the halogenated organic compounds are chlorotriazine herbicides, chloroacetanilide herbicides, halogenated aliphatic herbicides, halogen containing analogs thereof, halogen containing derivatives thereof, or combinations thereof. The disclosed invention is applicable for (in-situ or/and ex-situ) homogeneously or/and heterogeneously catalytically treating such contaminated water being a variety of different forms, such as ground water (e.g., sub-surface water regions, reservoirs, or aquifers), surface water (e.g., rivers, lakes, ponds, pools, or surface water reservoirs), above surface water (e.g., above surface water reservoirs, or above surface sources or supplies of residential or commercial drinking water), or a combination thereof.

The disclosed method includes the main procedure of exposing the contaminated water to a catalytically effective amount of at least one electron transfer mediator under reducing conditions, to thereby decrease the concentration of at least one of the halogenated organic compounds in the contaminated water. The disclosed system includes: at least one electron transfer mediator; and at least one (in-situ or/and ex-situ) unit for containing a catalytically effective amount of the at least one electron transfer mediator, for exposing the contaminated water to the at least one electron transfer mediator under reducing conditions.

The disclosed invention is based on using a chemical technique for catalytically treating the contaminated water, by exploiting catalytic chemical reaction types of phenomena, mechanisms, and processes, involving the use of at least one electron transfer mediator functioning as an active redox catalyst under reducing (typically, anaerobic or anoxic) conditions, for in-situ or/and ex-situ, homogeneously or/and heterogeneously, catalytically degrading, transforming, or converting, in particular, via reductive dehalogenation (typically, dechlorination) of, the halogenated organic compounds in the contaminated water to non-hazardous or/and less hazardous (poisonous or toxic) chemical species. Implementation of the disclosed invention results in decreasing the concentration of at least one of the halogenated organic compounds in the contaminated water.

As disclosed therein, preferably, the at least one electron transfer mediator is a porphyrinogenic organometallic complex, an analog thereof, a derivative thereof, or any combination thereof. Preferably, the at least one porphyrinogenic organometallic complex is a metalloporphyrin complex, a metallocorrin complex, a metallochlorin complex, or any combination thereof. Preferably, the metalloporphyrin complex is composed of a transition metal complexed to a (initially free base) porphyrin selected from the group consisting of: tetramethylpyridilporphyrin, also named and known as [5,10,15,20-tetrakis(1-methyl-4-pyridinio)-porphine], herein, abbreviated and also referred to as [TMPyP]; tetrahydroxyphenylporphyrine, also named and known as [5,10,15,20-tetrakis(4-hydroxyphenyl)-21H, 23H-porphine], herein, abbreviated and also referred to as [TP(OH)P]; tetraphenylporphyrin, also named and known as [5,10,15,20-tetraphenyl-21H,23H-porphine], herein, abbreviated and also referred to as [TPP]; and 4,4',4'',4'''-(porphine-5,10,15,20-tetrayl)tetrakis(benzenesulfonic acid), herein, abbreviated and also referred to as [TBSP].

The transition metal is essentially any transition metal capable of complexing with the just stated porphyrins for forming the corresponding metalloporphyrin complex. Preferably, the transition metal is cobalt [Co], nickel [Ni], iron [Fe], zinc [Zn], or copper [Cu]. Additional exemplary metalloporphyrin complexes which are suitable for implementing the disclosed invention are chlorophylls [magnesium (II) complexes], and hemes [iron (II) complexes]. An exemplary metallocorrin complex is vitamin $B_{12}$ [corrin ligand (porphyrin analog) complexed to a cobalt (III) ion].

Catalytically treating the contaminated water, involving catalytic degradation, transformation, or conversion, of the halogenated organic compounds in the contaminated water to non-hazardous or/and less hazardous chemical species, thereby decreasing the concentration of at least one of the halogenated organic compounds in the contaminated water, is effected according to homogeneous catalysis or/and according to heterogeneous catalysis, under reducing (anaerobic or anoxic) conditions. According to homogeneous catalysis, the catalytically effective amount of the at least one electron transfer mediator (catalyst) is an initially solid (typically, particulate) particulate substance that is non-supported, non-matrixed, non-intercalated, or/and non-trapped, by another material, and subsequently becomes freely mobile and soluble throughout the contaminated water. According to heterogeneous catalysis, the catalytically effective amount of the at least one electron transfer mediator (catalyst) is an initially solid (typically, particulate) substance that is supported, matrixed, intercalated, incorporated, or/and trapped, and generally immobile, on or/and inside of a (particulate or/and non-particulate) solid support or matrix material which subsequently becomes dispersed (i.e., not dissolved) throughout the contaminated water. Ordinarily, the initially immobilized catalytically effective amount of the at least one electron transfer mediator (catalyst) similarly becomes dispersed (i.e., not dissolved) throughout the contaminated water. However, any one or more immobilized electron transfer mediator may at least partially dissolve in the contaminated water, depending upon actual parameters and conditions of a given heterogeneous catalytic chemical reaction system during implementation of the disclosed invention.

For implementing the disclosed invention according to heterogeneous catalysis, in general, essentially any type of heterogeneous catalyst (preferably, but not limited to being, particulate) solid support or matrix material can be used for supporting, matrixing, and immobilizing, the at least one electron transfer mediator (catalyst). Exemplary types of suitable (particulate or/and non-particulate) solid support or matrix materials are diatomite (kieselguhr), amorphous silicas, crystalline silicas, silica gels, aluminas, minerals, ceramics, carbohydrates (such as sepharose, sephadex), clays, plastics (such as polystyrene), composites, and combinations thereof. A specific example of such an electron transfer mediator solid supported or matrixed configuration is the hereinabove previously described present applicant's diatomite/ZVM (zero valent metal)/electron transfer mediator composite type of heterogeneous catalyst.

Exposing the contaminated water to the catalytically effective amount of the at least one electron transfer mediator is performed, for example, according to homogeneous catalysis or according to heterogeneous catalysis, each via a batch mode, or, alternatively, each via a flow mode, for forming a respective homogeneous or heterogeneous catalytic reaction system of either mode, under reducing (anaerobic or anoxic) conditions, i.e., when reducing conditions, as opposed to oxidizing conditions, are prevalent in the contaminated water. According to homogeneous catalysis, via a batch or flow mode, either part of, or the entire, catalytically effective amount of the at least one electron transfer mediator is used 'as is', in a particulate form, i.e., as a generally dry, single particulate substance or mixture of several particulate substances. Alternatively, or additionally, prior to exposure to the contaminated water, either part of, or the entire, catalytically effective amount of the at least one electron transfer mediator is dissolved in one or more suitable (aqueous or/and organic) solvents at suitable conditions (temperature, pH, mixing), and then used in a solution form, i.e., as a solution of a dissolved single particulate substance or as a solution of a dissolved mixture of several particulate substances. According to heterogeneous catalysis, via a batch or flow mode, ordinarily, the entire catalytically effective amount of the at least one electron transfer mediator is used 'as is', in a particulate form, i.e., as a generally dry, single particulate substance or mixture of several particulate substances, of one or more electron transfer mediator solid supported or matrixed configurations.

Reducing conditions naturally exist, or/and are anthropogenically (human) produced, in the contaminated water. When reducing conditions are not present in the contaminated water, or are considered insufficient for effectively enabling the phenomena, mechanisms, and processes, of the electron transfer mediated (homogeneous or heterogeneous) catalytic reductive dehalogenation reactions, for catalyzing reductive dehalogenation of the halogenated organic compound contaminants in the contaminated water, then, there is need for anthropogenically producing the reducing conditions in the contaminated water.

Anthropogenically producing the reducing conditions in the contaminated water is performed by exposing the contaminated water to at least one bulk electron donor or reducing agent, immediately before, or/and during, or/and immediately after, exposing the contaminated water to the catalytically effective amount of the at least one electron transfer mediator. Alternatively, anthropogenically producing the reducing conditions in the contaminated water is performed by using an electron transfer mediator solid supported or matrixed configuration type of heterogeneous catalyst that already includes at least one bulk electron donor or reducing agent as part of the heterogeneous catalyst structure or composition.

In general, essentially any bulk electron donor or reducing agent capable of reducing an electron transfer mediator under reducing (anaerobic or anoxic) conditions can be used for implementing the disclosed invention. Preferably, the at least one bulk electron donor or reducing agent includes an elemental metal (zero valent metal), such as iron [Fe], lithium [Li], sodium [Na], potassium [K], beryllium [Be], magnesium [Mg], titanium [Ti], or any mixture thereof. Alternatively, the bulk electron donor or reducing agent compounds is titanium citrate [$Ti(OC(CH_2COOH)_2COOH$], potassium borohydride [$KBH_4$], sodium borohydride [$NaBH_4$], lithium hydride [LiH], potassium hydride [KaH], sodium hydride [NaH], borotrihydride [$BH_3$], aluminum trihydride [$AlH_3$], hydrazine [$H_2NNH_2$], triphenylphosphate [$PPh_3$], sodium dithionite (sodium hydrosulfite) [$Na_2S_2O_4$], or any combination thereof.

In general, for implementing the disclosed invention, the extent of time or duration (for example, hours, days, weeks, etc.) of exposing the contaminated water to the catalytically effective amount of the at least one electron transfer mediator, under reducing conditions, depends upon a variety of parameters and conditions of a given batch or flow mode homogeneous or heterogeneous catalytic reaction system. Exemplary applicable in-situ units for containing the catalytically effective amount of the at least one electron transfer mediator as a heterogeneous catalyst are either in a form as at least part of a ground water permeable reactive barrier (PRB) configured as a continuous filled in trench or wall, or as a stand-alone filled in well, or, in a form as part of a groundwater pumping and treatment system. An exemplary applicable ex-situ unit for containing the catalytically effective amount of the at least one electron transfer mediator as a homogeneous catalyst or/and as a heterogeneous catalyst is in a form as part of an above surface water treatment reactor system. The disclosed invention is generally applicable for catalytically treating water contaminated with other types or kinds of halogenated organic compounds, not limited to being halogenated organic herbicides, halogen containing analogs thereof, or halogen containing derivatives thereof.

The above summarized techniques are generally applicable for treating or remediating any of the above stated types and forms of geological matter, which may include sub-surface geological matter, which are contaminated or polluted with various different types and kinds of organic compound contaminants or pollutants, including those which may either be, or include, agrochemicals. However, the field and scope of the present invention are particularly directed to decreasing or preventing, specifically, 'sub-surface' geological matter (e.g., ground or earth, or/and water) contamination by agrochemicals.

Origin and Main Processes of Sub-Surface Geological Matter Contamination Resulting from Exposing Agricultural Substrates to Agrochemicals:

Any given technique for treating or remediating geological matter, in general, and sub-surface geological matter, in particular, contaminated or polluted with organic compound contaminants or pollutants, including those which may either be, or include, agrochemicals, typically has any number and types of advantages and disadvantages, depending upon the actual properties, parameters, characteristics, types and forms, and behavior, of the agricultural substrate(s), the agrochemical(s), and the sub-surface geological matter. Before describing specific problems and limitations of techniques for treating or remediating sub-surface geological matter contaminated with agrochemicals, it is useful to first briefly describe the origin and main processes of sub-surface geological matter contamination resulting from exposing agricultural substrates to agrochemicals.

Following applying or dispensing to, or/and upon, outer surfaces or/and immediately surrounding environments of plant matter or/and animal matter types of agricultural substrates, as part of cultivating, breeding, raising, developing, growing, or maintaining, the agricultural substrates, then, eventually, any number and types of naturally occurring moisture (i.e., in the air or atmosphere), dew, rain, snow, sleet, irrigation, or/and, human or/and machine washing of, or applying water to, the agricultural substrates (and agrochemicals upon them), as well as the immediately surrounding environment hosting or surrounding the agricultural substrates, wet the agricultural substrates, and typically, also the immediately surrounding environment hosting or surrounding the agricultural substrates. Thereafter, the water soluble and mobile agrochemicals, and possible initial degradation products thereof, become dissolved, transported, and, as a result of various diffusion, adsorption, desorption, and mass transfer processes, become heterogeneously distributed into, throughout, and among, various different horizontally or/and vertically extending zones or regions of the above stated types and forms of sub-surface geological matter.

Such zones or regions of the different forms of sub-surface geological matter begin at, and extend to, varying depths below or beneath the top or uppermost surface layer of a form of ground or earth, or of a form of water. For example, such zones or regions of sub-surface geological matter typically begin from a depth of about 5 centimeters, and can extend to a depth of about 2000 meters, below or beneath the top or uppermost surface layer of a form of ground or earth, or of a form of water. In the particular case where the sub-surface geological matter is an underground water reservoir, well or spring, or ground water, then, dissolution, transport, and heterogeneous distribution, of the agrochemical contaminants or pollutants may generate relatively large horizontally or/and vertically extending contaminant zones or regions, which are well known in the field and art as contaminant plumes (i.e., specific ground water zones or regions concentrated with contaminants or pollutants).

Main Problems and Limitations of Techniques for Treating or Remediating Sub-Surface Geological Matter Contaminated with Agrochemicals:

A main problem and limitation of practicing natural attenuation (NA) is based on the fact that it essentially entirely depends upon 'naturally' reducing or attenuating the various quantifiable parameters or properties, such as mass, toxicity, mobility, volume, or/and concentration, of the agrochemical contaminants or pollutants in the sub-surface geological matter. Meaningful natural attenuation can require time periods of on the order of years, thus accounting for the relatively long persistence of agrochemical contaminants or pollutants in sub-surface geological matter.

In the particular case where the contaminated or polluted sub-surface geological matter is an underground water reservoir, well or spring, or ground water, then, by practicing natural attenuation, long time periods of continuous underground water flow are often required for the various quantifiable parameters or properties of the agrochemical contaminants or pollutants, and possible degradation products, to be sufficiently decreased or attenuated in the underground water. In contrast to river water, which has a turnover time on the order of two weeks, ground water residence times are on the order of about 2 weeks to about 10,000 years. Additionally, the large horizontally or/and vertically extending, and heterogeneous, contaminant zones or regions (contaminant plumes) of underground water types of contaminated sub-surface geological matter tend to be very difficult to locate, detect, characterize, and treat or remediate.

Point (Localized) and Non-Point (Diffused) Sources of Contamination or Pollution:

In the field and art of environmental science and technology focusing on decreasing or preventing contamination of geological matter, in general, and of sub-surface geological matter, in particular, a given source of contamination or pollution can be categorized as either being a 'point (localized)' source of contamination or pollution, or as being a 'non-point (diffused)' source of contamination or pollution.

A 'point (localized)' source of contamination or pollution generally refers to any discernible, confined, or/and discrete, means of material conveyance or transport, including, but not limited to, pipes, ditches, channels, tunnels, conduits, wells, discrete fissures, containers, rolling stocks, concentrated animal feeding operations, or, vessels or other floating crafts, from which contaminants or pollutants, such as organic compound contaminants or pollutants, including those which may either be, or include, agrochemicals, are, or may be, discharged. A 'non-point' source of contamination or pollution generally refers to a source or potential source of contaminants or pollutants having a relatively large areal dimension that is not constrained to a single point or location of origin, or to a single stack, or is not introduced into a receiving stream from a specific outlet or source. Diffuse or non-point contaminant or pollution sources can be divided into source activities related to either land or water use, including failing septic tanks, improper animal-keeping practices, forest practices, and, urban and rural water runoff, and of course, sub-surface geological matter contamination resulting from exposing agricultural substrates to agrochemicals.

Another significant problem and limitation of techniques for treating or remediating sub-surface geological matter contaminated or polluted with agrochemicals, is based on the inherently fundamental and practical differences of the above two main categories of 'point (localized)' and 'non-point (diffused)' sources of contamination or pollution. Most, but not all, techniques for treating or remediating sub-surface geological matter contaminated or polluted with agrochemicals are practiced on point (localized), and not on non-point (diffused), sources of contamination or pollution. Attempting to practice treating or remediating techniques on non-point (diffused) sources of contamination or pollution, especially on large scale commercial agricultural or agricultural types of processes, inherently introduces a variety of problems and limitations, not the least of which are based on the relatively large amounts of human and financial resources needed to implement such practice. However, many large scale commercial agricultural or agricultural types of processes, such as those which involve applying or dispensing to, or/and upon, outer surfaces or/and immediately surrounding environments of plant matter or/and animal matter types of agricultural substrates, as part of cultivating, breeding, raising, developing, growing, or maintaining, the agricultural substrates, that cause sub-surface geological matter contamination, are characterizable as being in the category of non-point (diffused) sources of contamination or pollution. Thus, most techniques are inherently limited for treating or remediating sub-surface geological matter contaminated or polluted with agrochemicals, involving large scale commercial agricultural or agricultural types of processes.

Another, possibly even more significant problem and limitation of techniques for treating or remediating sub-surface geological matter contaminated or polluted with agrochemicals, is based the fact that most are practiced or implemented 'at the depth' of the immediate zone or region of the contaminants or pollutants. Such is the case when implementing treatment or remediation techniques based on use of in-situ permeable reactive barriers (PRBs), which involve placing or locating the treating or remediating 'active' substance(s) or material(s) in trenches or walls, or in stand-alone filled in wells, at the various depths of, typically, several separately located contaminant plumes. A similar case arises when implementing 'pump-and-treat' types of treatment or remediation techniques based on use of ground water pumping and treatment methods, equipment, and systems. This technique requires pumping the contaminated or polluted water from 'at the depth' of the immediate zone or region of the contaminants or pollutants, to an above surface, typically, off-site, location for treatment or remediation. Here too, relatively large amounts of human and financial resources are needed to successfully implement such techniques.

Based on the above described problems and limitations of techniques for treating or remediating geological matter, in general, and sub-surface geological matter, in particular, contaminated or polluted with organic compound contaminants or pollutants, including those which may either be, or include, agrochemicals, are ordinarily not technologically or/and economically feasible or viable for decreasing or preventing sub-surface geological matter contamination resulting from exposing agricultural substrates to agrochemicals. This is especially the case when large scale commercial agricultural or agricultural types of processes are involved.

Despite the numerous different types of techniques (methods, materials, compositions, devices, and systems) for treating or remediating geological matter, in general, which may include sub-surface geological matter, contaminated or polluted with various different types and kinds of organic compound contaminants or pollutants, including those which may either be, or include, agrochemicals, and in view of the above described problems and limitations of such techniques, there is a real and significant need for an entirely new approach to 'attack and solve' the problem of sub-surface geological matter contamination. In particular, there is a need for attacking and solving the problem of sub-surface contamination, upstream, and, 'spatially and temporally' closer, to the source(s) or point(s) of generation of the agrochemical contaminants or pollutants.

There is thus a need for, and it would be highly advantageous to have a method of exposing an agricultural substrate (plant matter, animal matter) to an agrochemical, and a method of decreasing or preventing sub-surface geological matter contamination resulting from exposing an agricultural substrate to an agrochemical. There is also a need for having such an invention which includes a composition used in those methods, and to an article-of-manufacture including the composition.

Moreover, there is a need for such an invention which is generally applicable to a wide variety of different plant matter or/and animal matter types and kinds of agricultural substrates. There is a further need for such an invention which is generally applicable to a wide variety of different categories, sub-categories, groups, sub-groups, and classes, of agrochemicals. There is a further need for such an invention which is generally applicable to a wide variety of different forms of ground or earth, or/and water, types of sub-surface geological matter. There is a further need for such an invention which is generally applicable to decreasing or preventing a wide variety of different types and kinds of 'point (localized)' and 'non-point (diffused)' sources of sub-surface geological matter contamination.

Moreover, there is a need for such an invention which is technologically and economically feasible, and highly effective for attacking and solving the problem of sub-surface geological matter contamination upstream, and, spatially and temporally closer, to the source(s) or point(s) of generation of the agrochemical contaminants or pollutants, that would allow continued use of agrochemicals in agricultural or/and agricultural types of processes without adversely affecting the environment.

SUMMARY OF THE INVENTION

The present invention relates to a method of exposing an agricultural substrate (plant matter, animal matter) to an agrochemical, and a method of decreasing or preventing sub-surface geological matter contamination resulting from exposing an agricultural substrate to an agrochemical. The present invention further relates to a composition used in those methods, and to an article-of-manufacture including the composition.

The method of exposing an agricultural substrate to an agrochemical, of the present invention, includes the main procedure of exposing the agricultural substrate to a composition which includes a combination of the agrochemical and at least one transforming agent capable of decreasing or eliminating the concentration of the agrochemical which contacts a sub-surface geological matter, such that contamination of the sub-surface geological matter by the agrochemical is decreased or prevented.

The method of decreasing or preventing sub-surface geological matter contamination resulting from exposing an agricultural substrate to an agrochemical, of the present invention, includes the main procedure of exposing the agricultural substrate to a composition which includes a combination of the agrochemical and at least one transforming agent capable of decreasing or eliminating the concentration of the agrochemical which contacts a sub-surface geological matter, thereby decreasing or preventing sub-surface geological matter contamination by the agrochemical.

The composition, of the present invention, includes a combination of at least one agrochemical and at least one transforming agent capable of decreasing or eliminating the concentration of the at least one agrochemical in a sub-surface geological matter.

The article-of-manufacture, of the present invention, includes a packaging material and the herein described composition being contained within the packaging material, the composition being identified for exposing an agricultural substrate to the agrochemical such that sub-surface geological matter contamination by the agrochemical is decreased or prevented.

The present invention is generally applicable to a wide variety of different plant matter types and kinds of agricultural substrates, such as crops, plants, trees, bushes, shrubs, vines, flowers, and weeds, or/and to a wide variety of different animal matter types and kinds of agricultural substrates, such as livestock, farm animals, zoo animals, marine animals, and sheltered animals. The present invention is generally applicable to a wide variety of different categories, sub-categories, groups, sub-groups, and classes, of agrochemicals, such as agrochemicals which promote or/and enhance cultivating, breeding, raising, growing, developing, maintaining, or/and storing, of agricultural substrates, in a positive manner, or, alternatively, in a negative manner.

The present invention is generally applicable to a wide variety of different forms of ground or earth types of sub-surface geological matter, such as soil, sand, rocks, stones, pebbles, gravel, and sediment. The present invention is generally applicable to a wide variety of different forms of water types of sub-surface geological matter, such as water that is present or contained in rivers, streams, lakes, ponds, pools, water reservoirs, wells or springs, ground water, and aquifers, as well as water that is present or contained in human made (commercial size) large volume water receiver, collection, or/and storage, vessels, containers, reservoirs, or chambers. The present invention is generally applicable to decreasing or preventing a wide variety of different types and kinds of 'point (localized)' and 'non-point (diffused)' sources of sub-surface geological matter contamination. The present invention is particularly applicable to decreasing or preventing 'non-point (diffused)' sources of sub-surface geological matter contamination, especially to cases when large scale commercial agricultural or agricultural types of processes are involved.

Moreover, the present invention is technologically and economically feasible, and highly effective for attacking and solving the problem of sub-surface geological matter contamination upstream, and, spatially and temporally closer, to the source or point of generation of the agrochemical contaminants or pollutants, that allows continued use of agrochemicals in agricultural or/and agricultural types of processes without adversely affecting the environment.

Thus, according to the present invention, there is provided a method of exposing an agricultural substrate to an agrochemical, the method comprising: exposing the agricultural substrate to a composition which comprises the agrochemical and at least one transforming agent capable of decreasing or eliminating the concentration of the agrochemical which contacts a sub-surface geological matter, such that contamination of the sub-surface geological matter by the agrochemical is decreased or prevented.

According to another aspect of the present invention, there is provided a method of decreasing or preventing sub-surface geological matter contamination resulting from exposing an agricultural substrate to an agrochemical, the method comprising: exposing the agricultural substrate to a composition which comprises the agrochemical and at least one transforming agent capable of decreasing or eliminating the concentration of the agrochemical which contacts a sub-surface geological matter, thereby decreasing or preventing sub-surface geological matter contamination by the agrochemical.

According to another aspect of the present invention, there is provided a composition comprising at least one agrochemical and at least one transforming agent capable of decreasing or eliminating the concentration of the at least one agrochemical in a sub-surface geological matter.

According to another aspect of the present invention, there is provided an article-of-manufacture comprising a packaging material and the herein described composition being contained within the packaging material, the composition being identified for exposing an agricultural substrate to the agrochemical such that sub-surface geological matter contamination by the agrochemical is decreased or prevented.

According to further characteristics in preferred embodiments of the invention described below, the agricultural substrate is selected from the group consisting of plant matter and animal matter.

According to further characteristics in preferred embodiments of the invention described below, the plant matter is harvested or cut plant matter.

According to further characteristics in preferred embodiments of the invention described below, the plant matter is selected from the group consisting of crops, plants, trees, bushes, shrubs, vines, flowers, and weeds.

According to further characteristics in preferred embodiments of the invention described below, the plant matter is selected from the group consisting of grains, vegetables, and fruits.

According to further characteristics in preferred embodiments of the invention described below, the animal matter is selected from the group consisting of livestock, farm animals, zoo animals, marine animals, and sheltered animals.

According to further characteristics in preferred embodiments of the invention described below, the animal matter is selected from the group consisting of cattle (cows), sheep (lamb), hogs (pigs), goats, oxen (steer), horses, chickens, turkeys, and fish.

According to further characteristics in preferred embodiments of the invention described below, the exposing is performed wherein the composition is in a physicochemical form or phase selected from the group consisting of a solid form or phase, a liquid form or phase, a vapor form or phase, a gas form or phase, and any combination thereof.

According to further characteristics in preferred embodiments of the invention described below, the exposing is performed via an exposing medium within and through which the composition is applied or dispensed to, or/and upon, the agricultural substrate.

According to further characteristics in preferred embodiments of the invention described below, the exposing is performed using human or/and mechanical ways or manners, or/and means.

According to further characteristics in preferred embodiments of the invention described below, the exposing is performed using human or/and mechanical ways or manners, or/and means.

According to further characteristics in preferred embodiments of the invention described below, the ways or manners, or/and means, are based on or/and involve a process selected from the group consisting of dripping, sprinkling, streaming, spraying, fumigating, and any combination thereof.

According to further characteristics in preferred embodiments of the invention described below, the process is based on or/and involves disinfecting, irrigating, watering, or/and washing, of the agricultural substrate.

According to further characteristics in preferred embodiments of the invention described below, the ways or manners, or/and means, are land-based, which are located and operated from upon the ground or earth, or/and sky-based, which are located and operated from above the ground or earth within the sky.

According to further characteristics in preferred embodiments of the invention described below, the composition is in a physicochemical form or phase selected from the group consisting of a solid form or phase, a liquid form or phase, a vapor form or phase, a gas form or phase, and any combination thereof.

According to further characteristics in preferred embodiments of the invention described below, the composition includes a plurality of agrochemicals.

According to further characteristics in preferred embodiments of the invention described below, the agrochemical promotes or/and enhances cultivating, breeding, raising, growing, developing, maintaining, or/and storing, of the agricultural substrate in a positive manner with respect to the agricultural substrate.

According to further characteristics in preferred embodiments of the invention described below, the agrochemical is selected from the group consisting of fertilizers, growth stimulators, plant growth regulators, hormones, synergists, and any combination thereof.

According to further characteristics in preferred embodiments of the invention described below, the agrochemical promotes or/and enhances cultivating, breeding, raising, growing, developing, maintaining, or/and storing, of the agricultural substrate in a negative or inhibitory manner against enemies of the agricultural substrate.

According to further characteristics in preferred embodiments of the invention described below, the agrochemical is selected from the group consisting of pesticides.

According to further characteristics in preferred embodiments of the invention described below, the pesticide is selected from the group consisting of acaricides, miticides, algicides, antifeedants, avicides, bactericides, bird repellants, chemosterilants, fungicides, herbicide safeners, herbicides, insect attractants, insect repellants, insecticides, mammal repellants, mating disrupters, molluscicides, nematicides, plant activators, plant growth regulators, rodenticides, synergists, and virucides, and any combination thereof.

According to further characteristics in preferred embodiments of the invention described below, the herbicide is selected from the group consisting of chlorotriazine herbicides, chloroacetanilide herbicides, and halogenated aliphatic herbicides.

According to further characteristics in preferred embodiments of the invention described below, the herbicide is a chlorinated organonitrogen herbicide selected from the group consisting of triazines, alachlor, and metolachlor.

According to further characteristics in preferred embodiments of the invention described below, the triazine is selected from the group consisting of atrazine, and cyanazine.

According to further characteristics in preferred embodiments of the invention described below, the agrochemical is the pesticide endosulfan, being an organochlorine or cyclodiene insecticide or acaricide type of halogenated organic compound.

According to further characteristics in preferred embodiments of the invention described below, the agrochemical is the pesticide lindane, being an organochlorine insecticide type of halogenated organic compound.

According to further characteristics in preferred embodiments of the invention described below, the agrochemical is in a physicochemical form or phase selected from the group consisting of a solid form or phase, a liquid form or phase, a vapor form or phase, a gas form or phase, and any combination thereof.

According to further characteristics in preferred embodiments of the invention described below, prior to entering the sub-surface geological matter, the at least one transforming agent primarily exhibits inactivity (i.e., substantially or essentially no activity) for decreasing or eliminating concentration of the agrochemical.

According to further characteristics in preferred embodiments of the invention described below, prior to entering the sub-surface geological matter, the at least one transforming agent primarily exhibits inactivity (i.e., substantially or essentially no activity) for affecting or/and interfering with structure, function, or/and effectiveness, of the agrochemical (A) with respect to the agricultural substrate.

According to further characteristics in preferred embodiments of the invention described below, the at least one transforming agent co-migrates and becomes co-distributed with the agrochemical within and throughout the sub-surface geological matter.

According to further characteristics in preferred embodiments of the invention described below, within the sub-surface geological matter, the at least one transforming agent primarily exhibits activity for decreasing or eliminating concentration of the agrochemical which contacts the sub-surface geological matter.

According to further characteristics in preferred embodiments of the invention described below, the activity is exhibited at spatially varying depths within the sub-surface geological matter.

According to further characteristics in preferred embodiments of the invention described below, the activity is exhibited at temporally varying times within the sub-surface geological matter.

According to further characteristics in preferred embodiments of the invention described below, the activity exhibited by the at least one transforming agent is a function of parameters and conditions, and changes thereof, of a type of phenomenon, mechanism, or process, selected from the group consisting of chemical, biological, physical, and any combination thereof.

According to further characteristics in preferred embodiments of the invention described below, the parameters and conditions, and the changes thereof, are selected from the group consisting of (a) oxygen content in the sub-surface geological matter, (b) temperature of the sub-surface geological matter, (c) pH of the sub-surface geological matter, (d) ionic strength of the sub-surface geological matter, (e) salinity concentration of the sub-surface geological matter, and (f) any combination thereof.

According to further characteristics in preferred embodiments of the invention described below, the at least one transforming agent and the agrochemical have a distribution or partition coefficient, $K_d$, of a same value.

According to further characteristics in preferred embodiments of the invention described below, the at least one transforming agent is an electron transfer mediator.

According to further characteristics in preferred embodiments of the invention described below, the at least one electron transfer mediator is a porphyrinogenic organometallic complex.

According to further characteristics in preferred embodiments of the invention described below, the porphyrinogenic organometallic complex is selected from the group consisting of a metalloporphyrin complex, a metallocorrin complex, a metallochlorin complex, and any combination thereof.

According to further characteristics in preferred embodiments of the invention described below, the metalloporphyrin complex is composed of a transition metal complexed to a (initially free base) porphyrin selected from the group consisting of:

tetramethylpyridilporphyrin [5,10,15,20-tetrakis(1'-methyl-4-pyridinio)-porphine] [TMPyP];

tetrahydroxyphenylporphyrine [5,10,15,20-tetrakis(4-hydroxyphenyl-21H, 23H-porphine] [TP(OH)P];

tetraphenylporphyrin [5,10,15,20-tetraphenyl-21H,23H-porphine] [TPP];

4,4',4'',4'''-(porphine-5,10,15,20-tetrayl)tetrakis(benzenesulfonic acid) [TBSP]; hematoporphyrin; and protoporphyrin IX.

According to further characteristics in preferred embodiments of the invention described below, the transition metal is selected from the group consisting of cobalt [Co], nickel [Ni], iron [Fe], zinc [Zn], and copper [Cu].

According to further characteristics in preferred embodiments of the invention described below, the metalloporphyrin complex is selected from the group consisting of:

tetramethylpyridilporphyrin-Nickel [5,10,15,20-tetrakis(1'-methyl-4-pyridinio)-porphine-Nickel] [TMPyP-Ni];

tetramethylpyridilporphyrin-Cobalt [5,10,15,20-tetrakis(1-methyl-4-pyridinio)-porphine-Cobalt] [TMPyP-Co];

tetramethylpyridilporphyrin-Iron [5,10,15,20-tetrakis(1-methyl-4-pyridinio)-porphine-Iron] [TMPyP-Fe];

tetrahydroxyphenylporphyrine-Nickel [5,10,15,20-tetrakis(4-hydroxyphenyl)-21H,23H-porphine-Nickel] [TP(OH)P—Ni];

tetrahydroxyphenylporphyrin-Cobalt [5,10,15,20-tetrakis(4-hydroxyphenyl-21H,23H-porphine-Cobalt] [TP(OH)P—Co];

4,4',4'',4'''-(porphine-5,10,15,20-tetrayl)tetrakis(benzenesulfonic acid)-Nickel [TBSP-Ni];

4,4',4'',4'''-(porphine-5,10,15,20-tetrayl)tetrakis(benzenesulfonic acid)-Cobalt [TBSP-Co];

hematoporphyrin-Cobalt;

protoporphyrin IX-Cobalt; and a combination thereof.

According to further characteristics in preferred embodiments of the invention described below, the metalloporphyrin complex is selected from the group consisting of a chlorophyll and a heme.

According to further characteristics in preferred embodiments of the invention described below, the metallocorrin complex is vitamin $B_{12}$ [corrin ligand (porphyrin analog) complexed to a cobalt (III) ion].

According to further characteristics in preferred embodiments of the invention described below, the at least one transforming agent is in a physicochemical form or phase selected from the group consisting of a solid form or phase, a liquid form or phase, a vapor form or phase, a gas form or phase, and any combination thereof.

According to further characteristics in preferred embodiments of the invention described below, the sub-surface geological matter exists in a form selected from the group consisting of ground or earth, water, and any combination thereof.

According to further characteristics in preferred embodiments of the invention described below, the form of ground or earth is selected from the group consisting of soil, sand, rocks, stones, pebbles, sediment, fragments thereof, and any combination thereof.

According to further characteristics in preferred embodiments of the invention described below, the form of water is selected from the group consisting of sub-surface rivers, streams, lakes, ponds, pools, and water reservoirs.

According to further characteristics in preferred embodiments of the invention described below, the form of water is present or contained in a human made sub-surface water receiver, collection, or/and storage, vessel, container, reservoir, or chamber.

According to further characteristics in preferred embodiments of the invention described below, the form of water is selected from the group consisting of ground water, an aquifer, and any combination thereof.

BRIEF DESCRIPTION OF THE DRAWING

The present invention is herein described, by way of example only, with reference to the accompanying drawing. With specific reference now to the drawing in detail, it is stressed that the particulars shown are by way of example and for purposes of illustrative description of the preferred embodiments of the present invention only, and are presented in the cause of providing what is believed to be the most useful and readily understood description of the principles and conceptual aspects of the present invention. In this regard, no attempt is made to show structural details of the present invention in more detail than is necessary for a fundamental understanding of the invention, the description taken with the drawing making apparent to those skilled in the art how the several forms of the invention may be embodied in practice. In the drawing:

FIG. 1 is a schematic diagram illustrating a partially perspective and partially cross-section view of exemplary specific preferred embodiments of implementing the present invention, wherein plant matter and animal matter exemplary specific types of agricultural substrates are in some stage of being cultivated, bred, raised, grown, developed, or/and maintained, and wherein the agricultural substrates are exposed to a composition [(A)/(T)] of an agrochemical (A) and at least one transforming agent (T) which together become dissolved, transported, and heterogeneously distributed into, throughout, and among, different zones or regions of sub-surface geological matter, in accordance with the present invention.

DESCRIPTION OF THE PREFERRED EMBODIMENTS

The present invention relates to a method of exposing an agricultural substrate (plant matter, animal matter) to an agrochemical, and a method of decreasing or preventing sub-surface geological matter contamination resulting from exposing an agricultural substrate to an agrochemical. The present invention further relates to a composition used in those methods, and to an article-of-manufacture including the composition.

The method of exposing an agricultural substrate to an agrochemical, of the present invention, includes the main procedure of exposing the agricultural substrate to a composition which includes a combination of the agrochemical and at least one transforming agent capable of decreasing or eliminating the concentration of the agrochemical which contacts a sub-surface geological matter, such that contamination of the sub-surface geological matter by the agrochemical is decreased or prevented.

The method of decreasing or preventing sub-surface geological matter contamination resulting from exposing an agricultural substrate to an agrochemical, of the present invention, includes the main procedure of exposing the agricultural substrate to a composition which includes a combination of the agrochemical and at least one transforming agent capable of decreasing or eliminating the concentration of the agrochemical which contacts a sub-surface geological matter, thereby decreasing or preventing sub-surface geological matter contamination by the agrochemical.

The composition, of the present invention, includes a combination of at least one agrochemical and at least one transforming agent capable of decreasing or eliminating the concentration of the at least one agrochemical in a sub-surface geological matter.

The article-of-manufacture, of the present invention, includes a packaging material and the herein described composition being contained within the packaging material, the composition being identified for exposing an agricultural substrate to the agrochemical such that sub-surface geological matter contamination by the agrochemical is decreased or prevented.

The present invention is generally applicable to a wide variety of different plant matter types and kinds of agricultural substrates, such as crops, plants, trees, bushes, shrubs, vines, flowers, and weeds, or/and to a wide variety of different animal matter types and kinds of agricultural substrates, such as livestock, farm animals, zoo animals, marine animals, and sheltered animals. The present invention is generally applicable to a wide variety of different categories, sub-categories, groups, sub-groups, and classes, of agrochemicals, such as agrochemicals which promote or/and enhance cultivating, breeding, raising, growing, developing, maintaining, or/and storing, of agricultural substrates, in a positive manner, or, alternatively, in a negative manner.

The present invention is generally applicable to a wide variety of different forms of ground or earth types of sub-surface geological matter, such as soil, sand, rocks, stones, pebbles, gravel, and sediment. The present invention is generally applicable to a wide variety of different forms of water types of sub-surface geological matter, such as water that is present or contained in rivers, streams, lakes, ponds, pools, water reservoirs, wells or springs, ground water, and aquifers, as well as water that is present or contained in human made (commercial size) large volume water receiver, collection, or/and storage, vessels, containers, reservoirs, or chambers. The present invention is generally applicable to decreasing or preventing a wide variety of different types and kinds of 'point (localized)' and 'non-point (diffused)' sources of sub-surface geological matter contamination. The present invention is particularly applicable to decreasing or preventing 'non-point (diffused)' sources of sub-surface geological matter contamination, especially to cases when large scale commercial agricultural or agricultural types of processes are involved.

Moreover, the present invention is technologically and economically feasible, and highly effective for attacking and solving the problem of sub-surface geological matter contamination upstream, and, spatially and temporally closer, to the source or point of generation of the agrochemical contaminants or pollutants, that allows continued use of agrochemicals in agricultural or/and agricultural types of processes without adversely affecting the environment.

A main aspect of novelty and inventiveness of the present invention is that it is highly effective for attacking and solving the problem of sub-surface geological matter contamination upstream, and, spatially and temporally closer, to the source or point of generation of agrochemical contaminants or pollutants. The at least one agrochemical which is applied or dispensed to, or/and upon, the outer (air or atmosphere exposed) surface or/and immediately surrounding environment of an agricultural substrate, as part of cultivating, breeding, raising, growing, developing, maintaining, or/and storing, the agricultural substrate, is spatially and temporally 'co-applied' or 'co-dispensed' with the at least one transforming agent capable of decreasing or eliminating the concentration of the at least one agrochemical in the sub-surface geological matter.

The inventors of the present invention are unaware of any prior art technique for treating or remediating sub-surface geological matter contamination resulting from exposing an agricultural substrate to an agrochemical, where the technique involves spatial and temporal 'co-applying' or 'co-dispensing' an agrochemical in combination with a transforming agent capable of decreasing or eliminating the concentration of the agrochemical in the sub-surface geological matter. As a matter of fact, by practicing or implementing prior art techniques of treating or remediating sub-surface geological matter contamination, typically, the treating or remediating 'active' substance(s) or material(s) would cause transformation, conversion, or/and degradation, of the agrochemical immediately, or soon thereafter, upon being in contact, and mixing, with the agrochemical.

Another main aspect of novelty and inventiveness of the present invention is that for many applications, a relatively small, and in some applications, an even minute, amount of the at least one transforming agent capable of decreasing or eliminating the concentration of the agrochemical which contacts a sub-surface geological matter, is required to be combined with the agrochemical, for forming the composition.

Another main aspect of novelty and inventiveness of the present invention is that it allows continued use of agrochemicals in agricultural or/and agricultural types of processes without adversely affecting the environment.

It is to be understood that the present invention is not limited in its application to the details of the order or sequence, and number, of procedures, steps, and sub-steps, of operation or implementation of the method, or to the details of the types or kinds of substances or materials of the composition, set forth in the following illustrative description, accompanying drawing, and examples, unless otherwise specifically stated herein. The present invention is capable of other embodiments and of being practiced or carried out in various ways. Although procedures, steps, sub-steps, and types or kinds of substances or materials similar or equivalent to those illustratively described herein can be used for practicing or testing the present invention, suitable procedures, steps, sub-steps, and types or kinds of substances or materials are illustratively described herein.

It is also to be understood that all technical and scientific words, terms, or/and phrases, used herein throughout the present disclosure have either the identical or similar meaning as commonly understood by one of ordinary skill in the art to which this invention belongs, unless otherwise specifically defined or stated herein. Phraseology, terminology, and, notation, employed herein throughout the present disclosure are for the purpose of description and should not be regarded as limiting. For example, herein, the terms 'contaminated' and 'polluted' are synonymous and equivalent to each other, and the terms 'contaminants' and 'pollutants' are synonymous and equivalent to each other. Moreover, all technical and scientific words, terms, or/and phrases, introduced, defined, described, or/and exemplified, in the above Background section, are equally or similarly applicable in the illustrative description of the preferred embodiments, examples, and appended claims, of the present invention. As used herein, the term 'about' refers to ±10% of the associated value. Additionally, as used herein, the phrase 'room temperature' refers to a temperature in a range of between about 20° C. and about 25° C.

Procedures, steps, sub-steps, and, types or kinds of substances or materials of the composition, as well as practice and implementation, of exemplary preferred embodiments, alternative preferred embodiments, specific configurations, and, additional and optional aspects, characteristics, or features, thereof, of the present invention, are better understood with reference to the following illustrative description and accompanying drawing.

In the following illustrative description of the present invention, included are main or principal procedures, steps, and sub-steps, and, main or principal types or kinds of substances or materials, needed for sufficiently understanding proper 'enabling' utilization and implementation of the disclosed invention. Accordingly, description of various possible preliminary, intermediate, minor, or/and optional, procedures, steps, or/and sub-steps, or/and, types or kinds of substances or materials, of secondary importance with respect to enabling implementation of the invention, which are readily known by one of ordinary skill in the art, or/and which are available in the prior art and technical literature relating to present invention, are at most only briefly indicated herein.

Thus, according to a main aspect of the present invention, there is provision of a method of exposing an agricultural substrate to an agrochemical, the method including the procedure of exposing the agricultural substrate to a composition which includes a combination of the agrochemical and at least one transforming agent capable of decreasing or eliminating the concentration of the agrochemical which contacts a sub-surface geological matter, such that contamination of the sub-surface geological matter by the agrochemical is decreased or prevented.

According to another main aspect of the present invention, there is provision of a method of decreasing or preventing sub-surface geological matter contamination resulting from exposing an agricultural substrate to an agrochemical, the method including the procedure of exposing the agricultural substrate to a composition which includes a combination of the agrochemical and at least one transforming agent capable of decreasing or eliminating the concentration of the agrochemical which contacts a sub-surface geological matter, thereby decreasing or preventing sub-surface geological matter contamination by the agrochemical.

According to further characteristics in preferred embodiments of the invention described below, prior to entering the sub-surface geological matter, the at least one transforming agent primarily exhibits inactivity (i.e., substantially or essentially no activity) for decreasing or eliminating concentration of the agrochemical. Moreover, prior to entering the sub-surface geological matter, the at least one transforming agent primarily exhibits inactivity (i.e., substantially or essentially no activity) for affecting or/and interfering with structure, function, or/and effectiveness, of the agrochemical (A) with respect to the agricultural substrate.

The at least one transforming agent co-migrates and becomes co-distributed with the agrochemical within and throughout the sub-surface geological matter. Within the sub-surface geological matter, the at least one transforming agent primarily exhibits activity for decreasing or eliminating concentration of the agrochemical which contacts the sub-surface geological matter. The activity is exhibited at spatially varying depths within the sub-surface geological matter, and is exhibited at temporally varying times within the sub-surface geological matter.

According to further characteristics in preferred embodiments of the invention described below, the activity exhibited by the at least one transforming agent is a function of parameters and conditions, and changes thereof, of a type of phenomenon, mechanism, or process, selected from the group consisting of chemical, biological, physical, and any combination thereof. The parameters and conditions, and the changes thereof, are selected from the group consisting of (a) oxygen content in the sub-surface geological matter, (b) temperature of the sub-surface geological matter, (c) pH of the sub-surface geological matter, (d) ionic strength of the sub-surface geological matter, (e) salinity concentration of the sub-surface geological matter, and (f) any combination thereof.

According to further characteristics in preferred embodiments of the invention described below, the at least one transforming agent and the agrochemical have a distribution or partition coefficient, $K_d$, of a same value.

According to further characteristics in preferred embodiments of the invention described below, the at least one transforming agent is at least one electron transfer mediator, for example, at least one porphyrinogenic organometallic complex.

According to another main aspect of the present invention, there is provision of a composition, the composition including a combination of at least one agrochemical and at least one transforming agent capable of decreasing or eliminating the concentration of the at least one agrochemical in a sub-surface geological matter.

Reference is made to FIG. 1, a schematic diagram illustrating a partially perspective and partially cross-section view of exemplary specific preferred embodiments of implementing the present invention. Shown in FIG. 1 are two exemplary specific types of agricultural substrates, plant matter (e.g., crops, plants, trees, bushes, shrubs, vines, flowers, or/and weeds), generally referenced by 10, and animal matter (e.g., cattle (cows)), generally referenced by 12, each of which is in some stage of being cultivated, bred, raised, grown, developed, or/and maintained. Plant matter 10 and animal matter 12 agricultural substrates are located in and encompassed by an agricultural or agricultural type of field or plot of land, generally referenced by 14, which has an air or atmosphere exposed surface 16 of the top or uppermost surface layer 18 of geological matter being a type of ground or earth, or/and water. All geological matter which is located below or beneath top or uppermost surface layer 18 of ground or earth is collectively considered as sub-surface geological matter.

Within agricultural or agricultural type of field or plot of land 14, air or atmosphere exposed surface 16 and top or uppermost surface layer 18 of ground or earth which host plant matter 10 and animal matter 12 types of agricultural substrates, contain geological matter generally being a type of ground or earth, or/and water. Such geological matter can be generally characterized as being inorganic, organic, non-aqueous, aqueous, or any combination thereof. In general, such geological matter exists in various different forms of the ground or earth, and in various different forms of water.

Exemplary specific forms of such ground or earth type of geological matter are soil, sand, rocks, stones, pebbles (i.e., small rocks or stones), sediment (i.e., matter deposited by water or wind), fragments thereof, or any combination thereof (e.g., gravel, being an unconsolidated combination (mixture) of rock fragments or pebbles). Exemplary specific forms such water type of geological matter are water that is, or/and may be, present or contained in, typically naturally existing, but possibly human made, rivers, streams, lakes, ponds, pools, and water reservoirs. Additional exemplary specific forms of such water type of geological matter are water that is, or/and may be, present or contained in human made (commercial size) large volume water receiver, collection, or/and storage, vessels, containers, reservoirs, or chambers.

Within agricultural or agricultural type of field or plot of land 14, plant matter 10 and animal matter 12 agricultural substrates are physically located and function (i.e., they exist by breathing, eating, etc.) upon air or atmosphere exposed surface 16 of top or uppermost surface layer 18 of ground or earth. In contrast to animal matter 12, plant matter 10, due to the presence of a depth dependent 'living' plant root system and associated plant roots, is also partly physically located and functions (exists) within and throughout top or uppermost surface layer 18. Accordingly, in such an embodiment, top or uppermost surface layer 18 is characterized by including within and throughout it a living plant root system and associated plant roots, and can therefore be classified, and equivalently referred to, as a plant matter root layer 18.

All geological matter which is located below or beneath top or uppermost surface layer (i.e., plant matter root layer) 18 of ground or earth is collectively considered as sub-surface geological matter. Thus, geological matter which is contained upon air or atmosphere exposed surface 16 of top or uppermost surface layer (i.e., plant matter root layer) 18 of ground or earth, as well as geological matter which is contained within and throughout top or uppermost surface layer (i.e., plant matter root layer) 18 of ground or earth, are not considered as sub-surface geological matter.

The depth of top or uppermost surface layer (i.e., plant matter root layer) 18 of ground or earth which extends from immediately below or beneath air or atmosphere exposed surface 16 to immediately above what is considered sub-surface geological matter, clearly varies, and primarily depends upon the type or kind, and, properties, characteristics, and behavior, of plant matter 10, in particular, regarding the living plant root system and associated plant roots which are located and function (exist) within and throughout top or uppermost surface layer (i.e., plant matter root layer) 18. This depth also depends upon the type or kind, and, properties, characteristics, and behavior, of geological matter which is contained upon air or atmosphere exposed surface 16, and upon the type or kind, and, properties, characteristics, and behavior, of geological matter which is contained within and throughout top or uppermost surface layer (i.e., plant matter root layer) 18 of ground or earth.

Typically, this depth from immediately below or beneath air or atmosphere exposed surface 16 to immediately above what is considered sub-surface geological matter, extends in a range of between about 5 centimeters and about 1.5 meters. Clearly, this depth proportionately increases for proportionately larger plant matter types of the agricultural substrate which have correspondingly proportionately larger and deeper living plant root systems and associated plant roots located and functioning (existing) within and throughout top or uppermost surface layer (i.e., the plant matter root layer) 18 of ground or earth. It is noted that within and throughout this depth, although below or beneath air or atmosphere exposed surface 16 which hosts plant matter 10 and animal matter 12 agricultural substrates, that agrochemicals also function as part of cultivating, breeding, raising, growing, developing, maintaining, or/and storing, the agricultural substrates, especially with respect to the plant matter root layer of plant matter 10.

As previously stated hereinabove, in FIG. 1, all geological matter which is located below or beneath top or uppermost surface layer (i.e., plant matter root layer) 18 of ground or earth is collectively considered as sub-surface geological matter. The collective sub-surface geological matter can be divided into a plurality of, e.g., three, separate zones or regions, generally referenced by 20, 22, and 24, and more specifically referred to as first sub-surface geological matter zone or region 20, second sub-surface geological matter zone or region 22, and third sub-surface geological matter zone or region 24, respectively.

First, second, and third, sub-surface geological matter zones or regions 20, 22, or/and 24, respectively, contain sub-surface geological matter generally being a type of ground or earth, or/and water. Such sub-surface geological matter can be generally characterized as being inorganic, organic, non-aqueous, aqueous, or any combination thereof. In general, such sub-surface geological matter exists in various different forms of the ground or earth, and in various different forms of water.

Exemplary specific forms of such ground or earth type of sub-surface geological matter are soil, sand, rocks, stones, pebbles (i.e., small rocks or stones), sediment (i.e., matter deposited by water or wind), fragments thereof, or any combination thereof (e.g., gravel, being an unconsolidated combination (mixture) of rock fragments or pebbles). Exemplary specific forms such water type of sub-surface geological matter are water that is, or/and may be, present or contained in, typically naturally existing, but possibly human made, 'sub-surface' rivers, streams, lakes, ponds, pools, and water reservoirs. Additional exemplary specific forms of such water type of geological matter are water that is, or/and may be, present or contained in human made (commercial size) 'sub-surface' large volume water receiver, collection, or/and storage, vessels, containers, reservoirs, or chambers.

Ground water (i.e., water found underground beneath the earth's surface within partially or fully saturated soil or/and permeable (e.g., porous) rock), and water of an aquifer (i.e., a water-bearing rock or rock formation, or an underground layer of permeable (porous) rock, sand, etc., containing water), are special cases of such sub-surface geological matter, wherein, for each of these forms of water, all of the water is 'entirely' located below or beneath top or uppermost surface layer (i.e., plant matter root layer) 18 of ground or earth.

As indicated hereinabove, sub-surface geological matter begins at, or from, a depth in a range of between about 5 centimeters and about 1.5 meters below or beneath air or atmosphere exposed surface 16 of top or uppermost surface layer (i.e., plant matter root layer) 18 of ground or earth. Accordingly, first sub-surface geological matter zone or region 20 begins at, or from, a depth in a range of between about 5 centimeters and about 1.5 meters below or beneath air or atmosphere exposed surface 16 of top or uppermost surface layer (i.e., plant matter root layer) 18 of ground or earth. Moreover, sub-surface geological matter can extend until a total depth of several hundreds of meters, and even to a total depth of more than 1000 meters, below or beneath air or atmosphere exposed surface 16 of top or uppermost surface layer (i.e., plant matter root layer) 18 of ground or earth, or of water. Accordingly, second, and third, sub-surface geological matter zones or regions 22, and 24, respectively, can extend until a depth of several hundreds of meters, and even to a depth of more than 1000 meters, below or beneath air or atmosphere exposed surface 16 of top or uppermost surface layer (i.e., plant matter root layer) 18 of ground or earth.

In general, typically, first, or/and second, and or/and third, sub-surface geological matter zones or regions 20, 22, or/and 24, respectively, may contain varying amounts of water. Such sub-surface geological matter zones or regions can be characterized as being 'partially' saturated with water, or as being 'fully' saturated with water, or as having essentially no water, i.e., a sub-surface geological matter zone or region being a form of water impermeable bedrock. Moreover, a given sub-surface geological matter zone or region may contain more or less water than other sub-surface geological matter zones or regions. Such water contained in sub-surface geological matter zones or regions arises from water which enters into first, or/and second, and or/and third, sub-surface geological matter zones or regions 20, 22, or/and 24, respectively, due to any number and types of naturally occurring moisture (i.e., in the air or atmosphere), dew, rain, snow, sleet, irrigation, or/and, human or/and machine washing of, or applying water to, the agricultural substrates (and agrochemicals upon them), as well as the immediately surrounding environment hosting or surrounding the agricultural substrates.

For example, for the exemplary specific embodiment illustrated in FIG. 1, first sub-surface geological matter zone or region 20 is characterized as being partially saturated with water, second sub-surface geological matter zone or region 22 is characterized as being fully saturated with water, and third sub-surface geological matter zone or region 24 is characterized as having essentially no water, i.e., being a form of water impermeable bedrock.

As shown in FIG. 1, each type of agricultural substrate, i.e., plant matter 10 and animal matter 12, is exposed to a composition [(A)/(T)], generally referenced by 30, which includes a combination of an agrochemical (A) and at least one transforming agent (T) capable of decreasing or eliminating the concentration of the agrochemical (A) which contacts the sub-surface geological matter, in particular, (at temporally varying times, and at spatially varying depths) within first (partially water saturated), and second (fully water saturated), sub-surface geological matter zones or regions 20, and 22, respectively. In FIG. 1, exposing the agricultural substrate, i.e., plant matter 10 or/and animal matter 12, to the composition [(A)/(T)] 30, herein, equivalently, but more briefly, referred to by the phrase 'the exposing', is generally indicated by the straight (i.e., not curved) line arrows extending from the composition [(A)/(T)] 30 to individual members, as well as to the immediately surrounding environment, of each type of agricultural substrate, i.e., plant matter 10 and animal matter 12.

Thus, with reference to FIG. 1, the method of decreasing or preventing sub-surface geological matter contamination resulting from exposing an agricultural substrate to an agrochemical, of the present invention, includes the main procedure of exposing the agricultural substrate, i.e., plant matter 10 or/and animal matter 12, to a composition [(A)/(T)] 30 which includes a combination of the agrochemical (A) and at least one transforming agent (T) capable of decreasing or eliminating the concentration of the agrochemical (A) which contacts a sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

Additionally, with reference to FIG. 1, the method of decreasing or preventing sub-surface geological matter contamination resulting from exposing an agricultural substrate, e.g., plant matter 10 or/and animal matter 12, to an agrochemical (A), of the present invention, includes the main procedure of exposing the agricultural substrate, i.e., plant matter 10 or/and animal matter 12, to a composition [(A)/(T)] 30 which includes a combination of the agrochemical (A) and at least one transforming agent (T) capable of decreasing or eliminating the concentration of the agrochemical (A) which contacts a sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical.

Applicable Agricultural Substrates:

Plant matter 10, being one of the two exemplary specific types of agricultural substrates located in and encompassed by agricultural or agricultural type of field 14, generally represents any number and type of plant entity, structure, substance, or material, which is in some stage of being cultivated, bred, raised, grown, developed, maintained, or/and stored, as well as to any number and type of plant entity, structure, substance, or material, which may be harvested or cut. In a non-limiting manner, exemplary types of plant matter 10 which are particularly relevant to the field and scope of application of the present invention are crops, plants, trees, bushes, shrubs, vines, flowers, and weeds. Exemplary types of plant matter 10 which are especially relevant to the field and scope of application of the present invention are commercial grain, vegetable, or fruit, types of crops or plants, and, flowers.

Animal matter 12, being another one of the two exemplary specific types of agricultural substrates located in and encompassed by agricultural or agricultural type of field 14, generally represents any number and type of animal entity, structure, substance, or material, which is living and in some stage of being bred, raised, grown, developed, maintained, or/and stored, as well as to any number and type of animal entity, structure, substance, or material, which may become non-living as a result of being slaughtered (typically, as a source of human consumable meat, poultry, or fish). In a non-limiting manner, exemplary types of animal matter 12 which are particularly relevant to the field and scope of application of the present invention are livestock, farm animals, zoo animals, marine animals, and sheltered animals. Exemplary types of animal matter 12 which are especially relevant to the field and scope of application of the present invention are commercial livestock, farm animals, and marine animals, such as cattle (cows), sheep (lamb), hogs (pigs), goats, oxen (steer), horses, chickens, turkeys, and fish.

Exposing the Agricultural Substrate to the Composition [(A)/(T)]:

Exposing the agricultural substrate, i.e., plant matter 10 or/and animal matter 12, to the composition [(A)/(T)] 30, herein, as previously stated, equivalently, but more briefly, referred to by the phrase 'the exposing', is performed according to any number and types of a wide variety of different specific ways or manners, using any number and types of a wide variety of different specific means, which are well known in the field and art of the present invention. Within the scope of application of the present invention, exposing the agricultural substrate, i.e., plant matter 10 or/and animal matter 12, to the composition [(A)/(T)] 30, is performed according to any number and types of a wide variety of different specific ways or manners, using any number and types of a wide variety of different specific means, such that the composition [(A)/(T)] 30 is applied or dispensed to, or/and upon, the outer (air or atmosphere exposed) surface or/and immediately surrounding environment of the agricultural substrate, i.e., plant matter 10 or/and animal matter 12, as part of cultivating, breeding, raising, growing, developing, maintaining, or/and storing, the agricultural substrate.

As described hereinbelow, in general, the agrochemical (A) (i.e., by itself, as distinguishable from the at least one transforming agent (T) and from any possible 'exposing medium', and the at least one transforming agent (T) (i.e., by itself, distinguishable from the agrochemical (A) and from any possible exposing medium), are each in essentially any number and types or kinds of possible physicochemical forms or phases. Such possible physicochemical forms or phases are selected from the group consisting of solid forms or phases, liquid forms or phases, vapor forms or phases, gas forms or phases, and combinations thereof. The agrochemical (A), and the at least one transforming agent (T), each in any of these possible physicochemical forms or phases, are then mixed or combined with each other, for forming the composition [(A)/(T)] 30, which then assumes or takes on any of these possible physicochemical forms or phases, to which is exposed (i.e., applied or dispensed to, or/and upon, the outer (air or atmosphere exposed) surface or/and immediately surrounding environment of) the agricultural substrate, i.e., plant matter 10 or/and animal matter 12. Accordingly, in general, 'the exposing', is performed wherein the composition [(A)/(T)] 30 is in a physicochemical form or phase selected from the group consisting of a solid form or phase, a liquid form or phase, a vapor form or phase, a gas form or phase, and any combination thereof.

Moreover, 'the exposing' is performed via an 'exposing medium' within and through which the composition [(A)/(T)] 30 (itself being in any of the above stated possible physicochemical forms or phases) is applied or dispensed to, or/and upon, the outer (air or atmosphere exposed) surface or/and immediately surrounding environment of) the agricultural substrate, i.e., plant matter 10 or/and animal matter 12. In general, the exposing medium (i.e., by itself, as distinguishable from the composition [(A)/(T)] 30), is in essentially any number and types or kinds of possible physicochemical forms or phases. Such possible physicochemical forms or phases are selected from the group consisting of solid forms or phases, liquid forms or phases, vapor forms or phases, gas forms or phases, and combinations thereof.

In general, 'the exposing' is performed by using any number and types or kinds of human or/and mechanical (semi-automated, fully automated) ways or manners, or/and means. For example, 'the exposing' is performed by using any number and types or kinds of human or/and mechanical (semi-automated, fully automated) ways or manners, or/and means, which are based on or/and involve a process selected from the group consisting of continuous or/and discontinuous dripping, sprinkling, streaming, spraying, fumigating (i.e., via fumes (smoke, vapor, or/and gas)), and any combination thereof.

Accordingly, 'the exposing' is performed via any of the above stated possible physicochemical forms or phases of the exposing medium within and through which the composition [(A)/(T)] 30 (being in any of the above stated possible physicochemical forms or phases) is applied or dispensed to, or/and upon, the outer (air or atmosphere exposed) surface or/and immediately surrounding environment of) the agricultural substrate, i.e., plant matter 10 or/and animal matter 12, by using any number and types or kinds of human or/and mechanical (semi-automated, fully automated) ways or manners, or/and means, which are based on or/and involve a process selected from the group consisting of continuous or/and discontinuous dripping, sprinkling, streaming, spraying, fumigating (i.e., via smoke, vapor, or/and gas), and any combination thereof. Moreover, 'the exposing' is performed wherein any of the preceding processes is based on or/and involves disinfecting, irrigating, watering, or/and washing, of the agricultural substrate, i.e., plant matter 10 or/and animal matter 12.

Furthermore, 'the exposing' is performed by using any number and types or kinds of human or/and mechanical (semi-automated, fully automated) ways or manners, or/and means, which are 'land-based', i.e., located and operated from upon the ground or earth, or/and which are 'sky-based', i.e., located and operated from above the ground or earth, i.e., within the sky. For example, land-based ways or manners, or/and means, typically involve pipes, tubes, sprinklers, or/and, tractors or/and similar types of agricultural mechanized pieces of equipment, which are located and operated from upon the ground or earth. For example, sky-based ways or manners, or/and means, typically involve piloted aircraft or/and pilot-less aircraft, such as airplanes (e.g., 'crop or field dusters'), which are located and operated from above the ground or earth, i.e., within the sky.

The Composition [(A)/(T)]:

The composition [(A)/(T)] 30 to which is exposed (i.e., applied or dispensed to, or/and upon, the outer (air or atmosphere exposed) surface or/and immediately surrounding environment of) the agricultural substrate, i.e., plant matter 10 or/and animal matter 12, as part of cultivating, breeding, raising, growing, developing, maintaining, or/and storing, the agricultural substrate) includes a combination of an agrochemical (A) and at least one transforming agent (T) capable of decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

Preferably, the composition [(A)/(T)] 30 corresponds to a 'physical' (i.e., non-chemically bonded) mixture or combination of the agrochemical (A) and the at least one transforming agent (T). Such a physical mixture or combination type of composition is readily prepared according to any number and types or kinds of techniques, using any number and types or kinds of equipment, which are well known in the field and art of chemistry, for mixing or combining chemical, biological, or/and physical, entities, structures, substances, materials, compounds, compositions, formulations, or/and organisms, for forming the composition [(A)/(T)] 30.

As stated herein, in general, the agrochemical (A) (i.e., by itself, as distinguishable from the at least one transforming agent (T) and from any possible 'exposing medium' (as described hereinabove)), and the at least one transforming agent (T) (i.e., by itself, distinguishable from the agrochemical (A) and from any possible exposing medium), are each in essentially any number and types or kinds of possible physicochemical forms or phases. Such possible physicochemical forms or phases are selected from the group consisting of solid forms or phases, liquid forms or phases, vapor forms or phases, gas forms or phases, and combinations thereof. The agrochemical (A), and the at least one transforming agent (T), each in any of these possible physicochemical forms or phases, are then mixed or combined with each other, for forming the composition [(A)/(T)] 30, which then assumes or takes on any of these possible physicochemical forms or phases, to which is exposed (i.e., applied or dispensed to, or/and upon, the outer (air or atmosphere exposed) surface or/and immediately surrounding environment of) the agricultural substrate, i.e., plant matter 10 or/and animal matter 12.

It is to be fully understood that the composition [(A)/(T)] 30, generally illustratively described herein as including a combination of a single agrochemical (A) and at least one transforming agent (T) capable of decreasing or eliminating the concentration of the agrochemical (A) which contacts sub-surface geological matter, in particular, within first (partially water saturated), and second (fully water saturated), sub-surface geological matter zones or regions 20, and 22, respectively, thereby decreasing or preventing sub-surface geological matter contamination by the agrochemical (A), in alternative embodiments, may include more than one agrochemical (A), i.e., a plurality of a number of, N, agrochemicals ($A_i$), for i=1 to N. According to such an embodiment, the at least one transforming agent (T) is capable of decreasing or eliminating the concentration of each agrochemical ($A_i$), for i=1 to N, which contacts sub-surface geological matter, in particular, within first (partially water saturated), and second (fully water saturated), sub-surface geological matter zones or regions 20, and 22, respectively, thereby decreasing or preventing sub-surface geological matter contamination by each agrochemical ($A_i$).

The Agrochemical (A):

The agrochemical (A), as included in the composition [(A)/(T)] 30, is generally any chemical, biological, or/and physical, entity, structure, substance, material, compound, composition, formulation, or/and organism, singly or in combination, which, by way of the composition [(A)/(T)] 30, is applied or dispensed to, or/and upon, the outer (air or atmosphere exposed) surface or/and immediately surrounding environment of the agricultural substrate, i.e., plant matter 10 or/and animal matter 12, as part of cultivating, breeding, raising, growing, developing, maintaining, or/and storing, the agricultural substrate.

The agrochemical (A), as included in the composition [(A)/(T)] 30, is, for example, a member of a first main category of agrochemicals which, being particularly relevant to the field and scope of application of the present invention, includes agrochemicals that promote or/and enhance cultivating, breeding, raising, growing, developing, maintaining, or/and storing, of the agricultural substrate, i.e., plant matter 10 or/and animal matter 12, in a positive manner (i.e., with respect to the agricultural substrate, i.e., plant matter 10 or/and animal matter 12). More specifically, the agrochemical (A) is, for example, a member of one or more exemplary sub-categories of agrochemicals included in the first main category of agrochemicals. Such sub-categories of agrochemicals are fertilizers, growth stimulators, plant growth regulators (those which 'positively' promote or/and enhance plant growth and development), hormones, synergists, and similar types of agrochemicals, which are applied or dispensed to, or/and upon, the outer surface or/and immediately surrounding environment of plant matter types of an agricultural substrate, as part of cultivating, breeding, raising, growing, developing, maintaining, or/and storing, plant matter 10, in a positive manner (i.e., with respect to plant matter 10).

The agrochemical (A), as included in the composition [(A)/(T)] 30, is, for example, a member of a second main category of agrochemicals which, being particularly relevant to the field and scope of application of the present invention, includes agrochemicals that promote or/and enhance cultivating, breeding, raising, growing, developing, maintaining, or/and storing, of the agricultural substrate, i.e., plant matter 10 or/and animal matter 12, in a negative or inhibitory manner (i.e., against 'enemies' of the agricultural substrate). More specifically, the agrochemical (A) is, for example, a member of an important exemplary sub-category of agrochemicals, being pesticides, included in the second main category, which are applied or dispensed to, or/and upon, the outer surface or/and immediately surrounding environment of plant matter or animal matter types of an agricultural substrate, as part of cultivating, breeding, raising, growing, developing, or maintaining, plant matter 10 or animal matter 12, in a negative or inhibitory manner (i.e., against enemy 'pests' of plant matter 10 or animal matter 12).

A pesticide, as an important exemplary sub-category of agrochemicals, is commonly known as generally being any chemical that is used to kill pests, such as insects, and rodents. Herein, in a more encompassing and general manner, which is particularly relevant to the field and scope of application of the present invention, a pest may be considered as essentially any living plant or animal organism, or any microorganism, which interferes with or/and inhibits cultivating, breeding, raising, growing, developing, maintaining, or/and storing, of the agricultural substrate, i.e., plant matter 10 or/and animal matter 12.

The agrochemical (A), as included in the composition [(A)/(T)] 30, is, for example, a member of any one or more major pesticide groups [1]. Major pesticide groups are: acaricides or miticides (lethal to ticks and mites), algicides, antifeedants, avicides (lethal to birds), bactericides, bird repellants, chemosterilants, fungicides, herbicide safeners, herbicides, insect attractants, insect repellants, insecticides, mammal repellants, mating disrupters, molluscicides, nematicides, plant activators (activate plant defense mechanisms against pests), plant growth regulators (those which inhibit pest plant growth), rodenticides, synergists, and virucides. This classified list of major pesticides groups represents at least fourteen hundred pesticide compounds. Moreover, each major pesticide group is sub-divided into chemical or other classes.

For implementing the present invention, for example, the herbicide is selected from the group consisting of chlorotriazine herbicides, chloroacetanilide herbicides, and halogenated aliphatic herbicides. For example, wherein the herbicide is a chlorinated organonitrogen herbicide (CONH) selected from the group consisting of triazines, alachlor, and metolachlor. For example, wherein the triazine type of chlorinated organonitrogen herbicide (CONH) is selected from the group consisting of atrazine, and cyanazine. Additionally, for example, wherein the agrochemical (A) is the well known pesticide endosulfan, being an organochlorine or cyclodiene insecticide or acaricide type of halogenated organic compound. Additionally, for example, wherein the agrochemical (A) is the well known pesticide lindane, being an organochlorine insecticide type of halogenated organic compound.

In general, the agrochemical (A) (i.e., by itself, as distinguishable from the at least one transforming agent (T) and from any possible 'exposing medium' (as described hereinabove)) is in essentially any number and types or kinds of possible physicochemical forms or phases. Such possible physicochemical forms or phases are selected from the group consisting of solid forms or phases, liquid forms or phases, vapor forms or phases, gas forms or phases, and combinations thereof. The agrochemical (A), and the at least one transforming agent (T), each in any of these possible physicochemical forms or phases, are then mixed or combined with each other, for forming the composition [(A)/(T)] 30, which then assumes or takes on any of these possible physicochemical forms or phases, to which is exposed (i.e., applied or dispensed to, or/and upon, the outer (air or atmosphere exposed) surface or/and immediately surrounding environment of) the agricultural substrate, i.e., plant matter 10 or/and animal matter 12.

The at Least One Transforming Agent (T):

The at least one transforming agent (T), as included in the composition [(A)/(T)] 30, is capable of decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

The at least one transforming agent (T), as included in the composition [(A)/(T)] 30, is generally any chemical, biological, or/and physical, entity, structure, substance, material, compound, composition, formulation, or/and organism, singly or in combination, which, by way of the composition [(A)/(T)] 30, is co-applied or co-dispensed with the agrochemical (A), as part of exposing the agricultural substrate, i.e., plant matter 10 or/and animal matter 12, to the composition [(A)/(T)] 30. The at least one transforming agent (T) is capable of decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

More specifically, prior to entering first (partially water saturated), and second (fully water saturated), sub-surface geological matter zones or regions 20, and 22, respectively, the at least one transforming agent (T), as included in the composition [(A)/(T)] 30, primarily exhibits 'inactivity' (i.e., substantially or essentially no activity) for transforming (i.e., degrading, transforming, or/and converting) the agrochemical (A) to non-hazardous or/and less hazardous (poisonous or toxic) compounds, and, therefore, exhibits 'inactivity' (i.e., substantially or essentially no activity) for decreasing or eliminating concentration of the agrochemical (A). Moreover, prior to entering first (partially water saturated), and second (fully water saturated), sub-surface geological matter zones or regions 20, and 22, respectively, the at least one transforming agent (T), preferably, primarily exhibits 'inactivity' (i.e., substantially or essentially no activity) for affecting or/and interfering with the structure, properties, characteristics, behavior, function, or/and effectiveness, of the agrochemical (A) as part of cultivating, breeding, raising, growing, developing, maintaining, or/and storing, the agricultural substrate, i.e., plant matter 10 or/and animal matter 12.

In FIG. 1, the preceding 'designed' and 'intended' 'inactivity' (i.e., substantially or essentially no activity regarding the agrochemical (A)) exhibited by the at least one transforming agent (T), as part of the composition [(A)/(T)] 30, is generally indicated by the co-migration, co-transport, and co-distribution, of the agrochemical (A) and of the at least one transforming agent (T) (i.e., each of whose "T" is without a superscript asterisk (*)) upon the outer (air or atmosphere exposed) surface or/and immediately surrounding environment of the agricultural substrate, i.e., plant matter 10 or/and animal matter 12, as well as, for example, upon air or atmosphere exposed surface 16 of top or uppermost surface layer (i.e., plant matter root layer) 18 of ground or earth, as well as, for example, within top or uppermost surface layer (i.e., plant matter root layer) 18 of ground or earth, of agricultural or agricultural type of field 14.

Following applying or dispensing the composition [(A)/(T)] 30 to, or/and upon, outer surfaces or/and immediately surrounding environments of the agricultural substrate, i.e., plant matter 10 or/and animal matter 12, as well as, for example, upon air or atmosphere exposed surface 16 of top or uppermost surface layer (i.e., plant matter root layer) 18 of ground or earth, as part of cultivating, breeding, raising, developing, growing, or maintaining, the agricultural substrates, i.e., plant matter 10 or/and animal matter 12, then, eventually, any number and types of naturally occurring moisture (i.e., in the air or atmosphere), dew, rain, snow, sleet, irrigation, or/and, human or/and machine washing of, or applying water to, the agricultural substrates (and agrochemicals upon them), as well as the immediately surrounding environment hosting or surrounding the agricultural substrates, wet the agricultural substrates, i.e., plant matter 10 or/and animal matter 12, and typically, also the immediately surrounding environment hosting or surrounding the agricultural substrates.

Thereafter, the water soluble and mobile agrochemical (A), and possible initial degradation products thereof, and the water soluble and mobile at least one transforming agent (T) primarily exhibiting 'inactivity' (i.e., substantially or essentially no activity with respect to the agrochemical (A)), become dissolved, transported, and, as a result of various diffusion, adsorption, desorption, and mass transfer processes, become heterogeneously distributed into and throughout top or uppermost surface layer (i.e., plant matter root layer) 18 of ground or earth. In FIG. 1, this process is generally indicated by the curved (i.e., not straight) line arrows extending from each water soluble and mobile agrochemical (A), as well as from each water soluble and mobile at least one transforming agent (T) primarily exhibiting 'inactivity' (i.e., substantially or essentially no activity with respect to the agrochemical (A)), and into top or uppermost surface layer (i.e., plant matter root layer) 18 of ground or earth.

Thereafter, the water soluble and mobile agrochemical (A), as well as the water soluble and mobile 'inactive' at least one transforming agent (T), become heterogeneously distributed into, throughout, and among, the various different horizontally or/and vertically extending first (partially water saturated), and second (fully water saturated), sub-surface geological matter zones or regions 20, and 22, respectively.

In first (partially water saturated), and second (fully water saturated), sub-surface geological matter zones or regions 20, and 22, respectively, there is no longer need for maintaining or preserving the structure, properties, characteristics, behavior, function, and effectiveness, of the agrochemical (A) as part of cultivating, breeding, raising, growing, developing, maintaining, or/and storing, the agricultural substrate, i.e., plant matter 10 or/and animal matter 12. Moreover, in first (partially water saturated), and second (fully water saturated), sub-surface geological matter zones or regions 20, and 22, respectively, the agrochemical (A) is considered a contaminant or pollutant which contaminates or pollutes such zones or regions of sub-surface geological matter, thereby causing sub-surface geological matter contamination. Thus, it is in these zones or regions of sub-surface geological matter that the at least one transforming agent (T) becomes 'active', and exhibits activity, for transforming (i.e., degrading, transforming, or/and converting) the agrochemical (A), to non-hazardous or/and less hazardous (poisonous or toxic) compounds, thereby decreasing or preventing sub-surface geological matter contamination by the agrochemical (A).

Thus, from the time that the agrochemical (A) and the at least one transforming agent (T) continue to co-migrate, and be co-transported and co-distributed, downward thru top or uppermost surface layer (i.e., plant matter root layer) 18 of ground or earth, and, then enter and further continue to co-migrate within and throughout first (partially water saturated), and second (fully water saturated), sub-surface geological matter zones or regions 20, and 22, respectively, the at least one transforming agent (T), as included in the composition [(A)/(T)] 30, primarily exhibits 'activity' with respect to transforming (i.e., degrading, transforming, or/and converting) the agrochemical (A) to non-hazardous or/and less hazardous (poisonous or toxic) compounds, and, therefore, exhibits 'activity' for decreasing or eliminating concentration of the agrochemical (A) which contacts the contaminated sub-surface geological matter. This procedure results in decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

In FIG. 1, the preceding 'designed' and 'intended' 'activity' exhibited by the at least one transforming agent (T), as part of the composition [(A)/(T)] 30, is generally indicated by the co-distribution of the agrochemical (A) and of the at least one transforming agent (T*) (i.e., each of whose "T" is with a superscript asterisk (*)) within first (partially water saturated), and second (fully water saturated), sub-surface geological matter zones or regions 20, and 22, respectively.

The above described change or switch of exhibiting 'inactivity' (i.e., substantially or essentially no activity with respect to the agrochemical (A)) to exhibiting 'activity' by the at least one transforming agent (T), is a function of main operating parameters and conditions, and changes thereof, associated with, and which control, any number and types of chemical, biological, or/and physical, phenomena, mechanisms, and processes, which are absent for the entire time period during which the at least one transforming agent (T), as included in the composition [(A)/(T)] 30, is co-applied or co-dispensed with the agrochemical (A), to, or/and upon, outer surfaces or/and immediately surrounding environments of the agricultural substrate, i.e., plant matter 10 or/and animal matter 12, as well as, for example, upon air or atmosphere exposed surface 16 of top or uppermost surface layer (i.e., plant matter root layer) 18 of ground or earth, as well as for the time period during which the agrochemical (A) and the at least one transforming agent (T) become heterogeneously distributed into and throughout top or uppermost surface layer (i.e., plant matter root layer) 18 of ground or earth.

However, from the time that the agrochemical (A) and the at least one transforming agent (T) continue to co-migrate, and be co-transported and co-distributed, downward thru top or uppermost surface layer (i.e., plant matter root layer) 18 of ground or earth, followed by entering and further continuing to co-migrate, and be co-transported and co-distributed, within and throughout first (partially water saturated), and second (fully water saturated), sub-surface geological matter zones or regions 20, and 22, respectively, the main operating parameters and conditions, and changes thereof, associated with, and which control, the chemical, biological, or/and physical, phenomena, mechanisms, and processes, cause activation of the at least one transforming agent (T) for transforming (i.e., degrading, transforming, or/and converting) the agrochemical (A) in the contaminated first (partially water saturated), and second (fully water saturated), sub-surface geological matter zones or regions 20, and 22, respectively, to non-hazardous or/and less hazardous (poisonous or toxic) compounds. This procedure results in decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively, thereby decreasing or preventing sub-surface geological matter contamination by the agrochemical (A).

Main operating parameters and conditions, and changes thereof, associated with, and which control, the chemical, biological, or/and physical, phenomena, mechanisms, and processes, that cause the above described change or switch of exhibiting 'inactivity' to exhibiting 'activity' by the at least one transforming agent (T), only when the agrochemical (A) and the at least one transforming agent (T) are located and co-migrate below or beneath top or uppermost surface layer (i.e., plant matter root layer) 18, i.e., within and throughout first (partially water saturated), and second (fully water saturated), sub-surface geological matter zones or regions 20, and 22, respectively, are selected from the group consisting of (a) oxygen content (i.e., concentration of oxygen dissolved in geological matter, in general, and in sub-surface geological matter, in particular), especially, as relating to a change from oxidizing conditions to reducing (anaerobic or anoxic) conditions, i.e., when reducing conditions are absent from the top or uppermost surface layer of the ground or earth, but are prevalent in the sub-surface geological matter (e.g., 'water-containing' first (partially water saturated), and second (fully water saturated), sub-surface geological matter zones or regions 20, and 22, respectively); (b) temperature of the geological matter, in general, and of the sub-surface geological matter, in particular; (c) pH of the geological matter, in general, and of the sub-surface geological matter, in particular; (d) ionic strength of the geological matter, in general, and of the sub-surface geological matter, in particular; (e) salinity concentration of the geological matter, in general, and of the sub-surface geological matter, in particular; and (f) any combination thereof.

Selection of the Agrochemical (A) and the at Least One Transforming Agent (T):

Among several possible categories, preferably, selection of the agrochemical (A) and of the at least one transforming agent (T), is based on the following two categories of properties, characteristics, behavior, and parameters. The first category is associated with the at least one transforming agent (T) being capable of decreasing or eliminating the concentration of the agrochemical (A) which contacts sub-surface geological matter, in particular, (at temporally varying times, and at spatially varying depths) within first (partially water saturated), and second (fully water saturated), sub-surface geological matter zones or regions 20, and 22, respectively. The first category is based on the temporal and spatial operation and occurrence of the hereinabove described main operating parameters and conditions, and changes thereof, associated with, and which control, the chemical, biological, or/and physical, phenomena, mechanisms, and processes, that cause the above described change or switch of exhibiting 'inactivity' (i.e., substantially or essentially no activity with respect to the agrochemical (A)) to exhibiting 'activity' (i.e., with respect to the agrochemical (A)) by the at least one transforming agent (T), only when the agrochemical (A) and the at least one transforming agent (T) are located and co-migrate below or beneath top or uppermost surface layer (i.e., plant matter root layer) 18 of ground or earth, i.e., within and throughout first (partially water saturated), and second (fully water saturated), sub-surface geological matter zones or regions 20, and 22, respectively.

Based on the preceding discussion, in an exemplary specific preferred embodiment of the present invention, the at least one transforming agent (T), as included in the composition [(A)/(T)] 30, is an 'electron transfer mediator'. As used herein, an 'electron transfer mediator' is a chemical substance, functioning as a catalyst or co-catalyst, which is catalytically active, and expedites (catalyzes) redox (reduction-oxidation) types of chemical reactions, such as reductive dehalogenation, by participating in, mediating, and expediting, the transfer of electrons from a bulk electron donor or reducing agent to an electron acceptor, or/and by stabilizing intermediate forms of the redox reactants. An electron transfer mediator which specifically functions by participating in, mediating, and expediting, the transfer of electrons from an electron donor or reducing agent to an electron acceptor is also known as an electron carrier or as an electron shuttle, since electrons are carried and shuttled by such a chemical species. Description, general mechanisms, teachings, and examples, of reductive dehalogenation, in general, and of zero valent metal (ZVM) reductive dehalogenation, in particular, of various different types and kinds of organic compound contaminants or pollutants, such as halogenated organic compounds, including those which may either be, or include, agrochemicals, catalyzed by an electron transfer mediator catalyst, are fully provided in the disclosures, i.e., PCT Int'l. Pat. Appl. Pub. No. WO 2006/072944, published Jul. 13, 2006, and concurrently filed PCT patent application, entitled: "Catalytically Treating Water Contaminated With Halogenated Organic Compounds", both by the present applicant (as cited and summarized hereinabove in the Background section). A specific example of an electron transfer mediator solid supported or matrixed configuration is the hereinabove described diatomite/ZVM (zero valent metal)/electron transfer mediator composite type of heterogeneous catalyst.

In general, essentially any electron transfer mediator functioning as an active redox catalyst under reducing (anaerobic or anoxic) conditions (e.g., which exist in 'water-containing' first (partially water saturated), and second (fully water saturated), sub-surface geological matter zones or regions 20, and 22, respectively) can be included in the at least one transforming agent (T), as included in the composition [(A)/(T)] 30, for implementing the present invention. Preferably, the at least one electron transfer mediator is selected from the group consisting of a porphyrinogenic organometallic complex, an analog thereof, a derivative thereof, and any combination thereof. Further details regarding preferred electron transfer mediators are described in the hereinabove cited and summarized present applicant disclosures.

Preferably, for implementing the present invention, there is identifying one or more specific porphyrinogenic organometallic complex types of electron transfer mediators, as included in the at least one transforming agent (T), which are capable of catalytically transforming (i.e., degrading, transforming, or/and converting) specific agrochemicals (A) under reducing (anaerobic or anoxic) conditions (e.g., which exist in 'water-containing' first (partially water saturated), and second (fully water saturated), sub-surface geological matter zones or regions 20, and 22, respectively). Exemplary pairs of an agrochemical (A) and a porphyrinogenic organometallic complex type of electron transfer mediator type of transforming agent (T), as included in the composition [(A)/(T)] 30, are as follows:

(i) atrazine with: (1) TP(OH)P—Co, or (2) TMPyP-Ni, or (3) TMPyP-Co, or (4) TBSP-Co, for example, based on the (catalytic) degradation results shown and described in Examples 1-4 in present applicant's concurrently filed PCT patent application, entitled: "Catalytically Treating Water Contaminated With Halogenated Organic Compounds";

(ii) endosulfan with: (1) TMPyP-Ni, or (2) TMPyP-Co, or (3) TMPyP-Fe, or (4) TP(OH)P—Ni, or (5) TP(OH)P—Co, or (6) TBSP-Ni, or (7) TBSP-Co, or (8) hematoporphyrin-Co, or (9) protoporphyrin IX-Co, or (10) vitamin $B_{12}$ (cyanocobalamin), for example, based on the (catalytic) degradation results shown and described hereinbelow, in Example 1; and (iii) lindane with vitamin $B_{12}$ (cyanocobalamin), for example, based on the (catalytic) degradation results shown in the following Table 1:

TABLE 1

Lindane concentration (weight percent) measured as a function of reaction time (minutes), for the batch mode homogeneous catalytic reductive dechlorination reaction of lindane in lindane contaminated water, effected by the transforming agent (T) being an electron transfer mediator (homogeneous) catalyst, being vitamin $B_{12}$ on a diatomite matrix, with zero valent iron (ZVI) [$Fe^0$] as a bulk electron donor or reducing agent, at room temperature and atmospheric pressure.

| Reaction time (minutes), following introduction of transforming agent (T) catalyst to lindane contaminated water | Control | Lindane concentration (weight percent) |
|---|---|---|
| 10 | 100.00 | 1.13 |
| 30 | 100.00 | 0.61 |
| 60 | 100.00 | 0.04 |

Additional pairs of an agrochemical (A) and a porphyrinogenic organometallic complex type of electron transfer mediator type of transforming agent (T), can be found in the literature; e.g., DDT (DichloroDiphenylTrichloroethane-[$C_{14}H_9Cl_5$]) has been studied [25]. More generally, other types of halo-organic substances have been degraded with porphyrinogenic organometallic complex types of an electron transfer mediator type of transforming agent (T), and can be found in the literature.

The second category of properties, characteristics, behavior, and parameters, which is used for selection of the agrochemical (A) and of the at least one transforming agent (T), is associated with the at least one transforming agent (T) and the agrochemical (A) being capable of co-migrating and being co-distributed as much as possible during the various stages described hereinabove, throughout the geological matter, and sub-surface geological matter, in particular, (at temporally similar times, and at spatially similar depths) within first (partially water saturated), and second (fully water saturated), sub-surface geological matter zones or regions 20, and 22, respectively, following exposing the agricultural substrate, i.e., plant matter 10 or/and animal matter 12, to the composition [(A)/(T)] 30.

For example, according to the above described exemplary specific preferred embodiment of the present invention, wherein the at least one transforming agent (T), as included in the composition [(A)/(T)] 30, is an electron transfer mediator, then, this second category of properties, characteristics, behavior, and parameters, pertains to transport properties of both the agrochemical (A) and the associated or paired electron transfer mediator type of transforming agent (T). Agrochemical-electron transfer mediator co-application, co-migration, and co-distribution, are considered in terms of both homogeneous (e.g., pure powder or liquid/aqueous) form or/and in an immobilized form (e.g., powder consisting of the electron transfer mediator, and possibly a bulk electron donor or reducing agent, immobilized in, e.g., diatomite, possibly within an aqueous solution). In each case, following exposing the agricultural substrate, i.e., plant matter 10 or/and animal matter 12, to the composition [(A)/(T)] 30, the paired substances (i.e., the agrochemical (A) and the electron transfer mediator transforming agent (T)) will co-migrate with each other, and with the water, through the (typically permeable or porous) geological matter, in general, and through the (typically permeable or porous) sub-surface geological matter, in particular, (at temporally similar times, and at spatially similar depths) within first (partially water saturated), and second (fully water saturated), sub-surface geological matter zones or regions 20, and 22, respectively.

Permeability is a property of a permeable (typically porous) medium itself that expresses the ease with which fluids (gases, liquids, or other substances) can flow through it. It describes the ability of a material to allow the passage of a liquid, such as water through rocks. Permeable (e.g., porous) materials, such as gravel and sand, allow water to move quickly through them, whereas less permeable (porous) materials, such as clay, don't allow water to flow freely.

As used herein, consistent with that known in the fields of fluid dynamics, hydraulics, and geology, the permeability, k, is an intrinsic physicochemical property or parameter of a permeable (e.g., porous) substance or material that quantifies the ability of the permeable (porous) substance or material to transmit a fluid, for example, liquid phase water, through it, naturally or forcibly, evaluated at specified operating and environmental conditions (for example, temperature, pressure, natural/forced flow, absence or presence of surrounding materials which may influence the bulk packing and density of the permeable (porous) substance or material), and has dimensions of distance times distance (for example, $cm^2$).

Permeable (porous) substances or materials, for example, soil, sand, as well as layers or regions of rocks, stones, pebbles, sediment, fragments thereof, or any combination thereof (e.g., gravel, being an unconsolidated combination (mixture) of rock fragments or pebbles), contained in permeable (porous) geological matter, in general, and in the permeable sub-surface geological matter zones or regions, are typically heterogeneous, and the extent of heterogeneity of the permeable (porous) substance or material, in addition to being a function of operating and environmental conditions, is also a function of volume and mass scales of measurement. Accordingly, the permeability, k, of such permeable (e.g., porous) substances or materials corresponds to an "average" physicochemical property or parameter, relevant to the volume and mass scales of measurement.

Fast transport, primarily by advective flow through preferential pathways (e.g., fractures, soil cracks, root holes, wormholes, etc.), enables co-migration and co-distribution of both solutes, [i.e., the agrochemical (A) (e.g., a pesticide) and a transforming agent (T) (e.g., an electron transfer mediator)] to the water table region within first (partially water saturated), and second (fully water saturated), sub-surface geological matter zones or regions 20, and 22, respectively, without strong influences of processes such as molecular diffusion, advective/dispersive transfer into less mobile regions, or/and chemical adsorption-desorption (i.e., partitioning) onto the soil/aquifer matrix. In such cases, as long as both the agrochemical (A) and the electron transfer mediator type of transforming agent is (T) are in dissolved form, they will co-migrate and be co-distributed together until they reach a reducing environment at depth, at which point the transforming agent (T) will initiate transforming (i.e., degrading, transforming, or/and converting) of the agrochemical (A). Thus, in these ubiquitous situations, the efficacy of co-applying an electron transfer mediator type of transforming agent (T) together with an agrochemical (A) is clear.

When flow conditions are such that transport is relatively slow, processes such as molecular diffusion, advective/dispersive transfer into less mobile regions, or/and chemical adsorption-desorption (i.e., partitioning) onto the soil/aquifer matrix within first and second sub-surface geological matter zones or regions 20 and 22, respectively, can become significant. During such flow conditions, the distribution coefficient, or partition coefficient, $K_d$, can be used to quantify the distributing or partitioning (adsorption-desorption) properties of both the agrochemical (A) and the electron transfer mediator type of transforming agent (T), and thus predict their transport (migration) properties. Adsorption and desorption strengths of the agrochemical (A) and of the electron transfer mediator type of transforming agent (T) are functions of the chemical properties thereof, of the soil type, and of the amount of organic matter present in the soil, within first and second sub-surface geological matter zones or regions 20 and 22, respectively.

The distribution coefficient, $K_d$, is a parameter describing the distribution of a chemical between solid and liquid phases in the same system, and is usually utilized for describing partitioning of chemicals between soil (i.e., the solid phase) and water (i.e., the liquid phase). The distribution coefficient, $K_d$, can be defined as the ratio of the quantity (e.g. mass, molar) of solute species absorbed, adsorbed, or/and precipitated on the solid phase (e.g. sediment, permeable or porous matrix) per unit weight of the solid phase, to the solute concentration in the liquid phase per unit volume of the liquid phase.

A wide range of values of the partition coefficient, $K_d$, exists for agrochemicals, such as pesticides. The halogenated organic compound type of pesticide, DDT (DichloroDiphenylTrichloroethane-[$C_{14}H_9Cl_5$]), for example, has a partition coefficient, $K_d$, value roughly 20,000 times as high as that for aldicarb and 1,500 times as high as that for atrazine. While specific values of the partition coefficient, $K_d$, for metalloporphyrin catalysts (i.e., as exemplary electron transfer mediator types of a transforming agent (T)) in soils are not readily available, the class of metalloporphyrins is very broad, and a wide range of the partition coefficient, $K_d$, is also likely to exist.

It is recognized that organic matter and clay content are the most important soil constituents determining retention (and therefore, distributing or partitioning) of agrochemicals (A), such as pesticides, and of electron transfer mediator types of transforming agents (T), such as metalloporphyrin catalysts. As such, a very wide range of values of the partition coefficient, $K_d$, will arise for both pesticides and metalloporphyrin catalysts. When pesticide-metalloporphyrin pairs with similar values of the partition coefficient, $K_d$, are co-applied, they will co-migrate and be co-distributed through the soil/aquifer region at similar rates, and thus the metalloporphyrin catalyst (i.e., the transforming agent (T)) will initiate transformation (i.e., degradation, transformation, or/and conversion) of the pesticide (i.e., the agrochemical (A)) once they (simultaneously, temporally, at the same time) reach a reducing environment at a spatially similar depth, within first and second sub-surface geological matter zones or regions 20, and 22, respectively.

It is critical to note that the required amounts of metalloporphyrins are catalytic, i.e., orders of magnitude smaller than the amount of the agrochemicals (A) themselves. Thus, only minute amounts of metalloporphyrin catalysts as transforming agents (T) are required during their co-application with the agrochemicals, in order to enable sub-surface agrochemical transformation, degradation, or/and conversion. For example, weight ratio of metalloporphyrin catalyst to the agrochemical (A) active ingredient being in a range of, preferably, between about 10:1 and about 1:10,000, more preferably, between about 2:1 and about 1:5000, and most preferably, between about 1:1 and about 1:1000. Moreover, there is a wide range of weights for both potential metalloporphyrin catalysts and agrochemicals; accordingly, the ranges are also large.

Metalloporphyrin catalyst activation is anticipated only after the agrochemical (A), and the metalloporphyrin catalyst transforming agent (T), have co-migrated to a depth which is located below or beneath top or uppermost surface layer (i.e., plant matter root layer) 18 of ground or earth. The depth of top or uppermost surface layer (i.e., plant matter root layer) 18 of ground or earth which extends from immediately below or beneath air or atmosphere exposed surface 16 to immediately above what is considered sub-surface geological matter, and within which agrochemicals are not desired, is generally in the range: below from about 5 cm (centimeters) to about 20 m (meters) depth; more typically, below from about 30 cm (centimeters) to about 5 m (meters) depth; and most typically, below from about 50 cm (centimeters) to about 1.5 m (meters) depth. Agrochemicals are beneficial in the upper (near surface) layer, up to about 1.5 m depth; below this depth, they ordinarily become useless for agricultural needs, and become dangerous/undesirable contaminants in the water/soil environment.

As previously stated hereinabove, the depth of top or uppermost surface layer (i.e., plant matter root layer) 18 of ground or earth which extends from immediately below or beneath air or atmosphere exposed surface 16 to immediately above what is considered sub-surface geological matter, clearly varies, and primarily depends upon the type or kind, and, properties, characteristics, and behavior, of plant matter 10, in particular, regarding the living plant root system and associated plant roots which are located and function (exist) within and throughout top or uppermost surface layer (i.e., plant matter root layer) 18. This depth also depends upon the type or kind, and, properties, characteristics, and behavior, of geological matter which is contained upon air or atmosphere exposed surface 16, and upon the type or kind, and, properties, characteristics, and behavior, of geological matter which is contained within and throughout top or uppermost surface layer (i.e., plant matter root layer) 18 of ground or earth.

Accordingly, metalloporphyrin catalyst activation will occur within the sub-surface geological matter wherein the agrochemicals are no longer needed. This corresponds to a depth below or beneath air or atmosphere exposed surface 16 being in a general range of between about 5 cm and about 150 m depth; more typically, in a range of between about 30 cm and about 100 m depth, and most typically, in a range of between about 50 cm and about 75 m depth.

Advantage is taken of spatial and temporal factors: namely, that the metalloporphyrin catalyst, as the transforming agent (T), is co-applied and co-dispensed simultaneously (temporally) with the agrochemical (A), but is nonreactive with it, until at a later time, once the agrochemical and the metalloporphyrin catalyst have reached a certain (spatial) depth (with correspondingly suitable environmental conditions, i.e., reducing environmental conditions), such that the metalloporphyrin catalyst is activated to begin transforming (i.e., degrading, transforming, or/and converting) the agrochemical.

Reducing environmental conditions needed for metalloporphyrin-catalyzed degradation of agrochemicals are 'naturally' present in ground water systems which are located near the water table region, within first and second sub-surface geological matter zones or regions 20, and 22, respectively. This unique situation enables the co-application, co-migration, co-transport, and co-distribution, of metalloporphyrin catalysts (as exemplary electron transfer mediator type transformation agents) with agrochemicals. As illustratively described hereinabove, only minute amounts of metalloporphyrin catalyst are required, and catalyst activation is anticipated only after the agrochemical has migrated to layers in the sub-surface geological matter where it is no longer needed, and in fact, constitutes a serious contaminant therein. While reference is made to contaminated groundwater (as an exemplary specific form of a sub-surface geological matter), contamination of surface water may occur by run-off or/and hydraulic connection or interaction with polluted groundwater. Co-application, co-migration, co-transport, and co-distribution, of the metalloporphyrin catalysts (as exemplary electron transfer mediator type transformation agents) with agrochemicals, as disclosed herein, may thus also decrease the agrochemical (e.g., pesticide) concentrations reaching surface waters, or/and initiate transforming (i.e., degrading, transforming, or/and converting) of the agrochemical within the surface waters.

In general, the at least one transforming agent (T) (i.e., by itself, as distinguishable from the agrochemical (A) and from any possible 'exposing medium') is in essentially any number and types or kinds of possible physicochemical forms or phases. Such possible physicochemical forms or phases are selected from the group consisting of solid forms or phases, liquid forms or phases, vapor forms or phases, gas forms or phases, and combinations thereof. The at least one transforming agent (T), and the agrochemical (A), each in any of these possible physicochemical forms or phases, are then mixed or combined with each other, for forming the composition [(A)/(T)] 30, which then assumes or takes on any of these possible physicochemical forms or phases, to which is exposed (i.e., applied or dispensed to, or/and upon, the outer (air or atmosphere exposed) surface or/and immediately surrounding environment of) the agricultural substrate, i.e., plant matter 10 or/and animal matter 12.

The Article-of-Manufacture Including the Composition [(A)/(T)]:

According to another main aspect of the present invention, there is provision of an article-of-manufacture, the article-of-manufacture includes a packaging material and the herein described composition being contained within the packaging material, the composition being identified for exposing an agricultural substrate to the agrochemical such that sub-surface geological matter contamination by the agrochemical is decreased or prevented.

Accordingly, with reference again made to FIG. 1, the article-of-manufacture includes a packaging material and the hereinabove illustratively described composition, i.e., composition [(A)/(T)] 30, being contained within the packaging material. The composition [(A)/(T)] 30 is identified for exposing, as illustratively described hereinabove, an agricultural substrate, i.e., plant matter 10 or/and animal matter 12, to the agrochemical (A), such that contamination of sub-surface geological matter, i.e., first (partially water saturated), and second (fully water saturated), sub-surface geological matter zones or regions 20, and 22, respectively, by the agrochemical (A) is decreased or prevented.

In general, any of the above described preferred embodiments or formulations of the composition [(A)/(T)], of the present invention, is suitable as being contained within the packaging material, wherein the composition is identified for exposing an agricultural substrate to the agrochemical such that sub-surface geological matter contamination by the agrochemical is decreased or prevented, as illustratively described hereinabove.

Preferably, the packaging material is made and constructed of materials which are inert to, and minimally, if at all, 'chemically' interact with, either the agrochemical (A) or the at least one transforming agent (T).

Above illustratively described novel and inventive aspects and characteristics, and advantages thereof, of the present invention further become apparent to one ordinarily skilled in the art upon examination of the following examples, which are not intended to be limiting. Additionally, each of the various embodiments and aspects of the present invention as delineated herein above and as claimed in the claims section below finds experimental support in the following examples.

EXAMPLES

Reference is now made to the following examples, Examples 1 and 2, which together with the above description, illustrate the invention in a non-limiting fashion.

As illustratively described hereinabove, among several possible categories, preferably, selection of the agrochemical (A) and of the at least one transforming agent (T), which are included in the composition [(A)/(T)] of the present invention, is based on two categories of properties, characteristics, behavior, and parameters.

The first category is associated with the at least one transforming agent (T) being capable of decreasing or eliminating the concentration of the agrochemical (A) which contacts sub-surface geological matter, following co-migration, co-transport, and co-distribution, of the co-applied or co-dispensed agrochemical (A) and at least one transforming agent (T) in the form of the composition [(A)/(T)] of the present invention, to, or/and upon, outer surfaces or/and immediately surrounding environments of an agricultural substrate.

Accordingly, the main objective of hereinbelow Example 1 was for studying the extent by which several different exemplary specific porphyrinogenic organometallic complex types of electron transfer mediators, as exemplary transforming agents (T), are each (i.e., separately) capable of catalytically transforming (i.e., degrading, transforming, or/and converting) an exemplary specific agrochemical (A), being the pesticide endosulfan (an organochlorine or cyclodiene insecticide or acaricide type of halogenated organic compound), under reducing (anaerobic or anoxic) conditions (i.e., water present conditions) which typically, naturally exist in 'water-containing' (i.e., partially or fully water saturated) types of sub-surface geological matter.

For further exemplifying this particular aspect or characteristic of the present invention, additional examples of reductive dehalogenation, in general, and of zero valent metal (ZVM) reductive dehalogenation, in particular, of various different types and kinds of organic compound contaminants or pollutants, such as halogenated organic compounds, including those which may either be, or include, agrochemicals, catalyzed by an electron transfer mediator catalyst, are fully provided in the Examples sections of the disclosures, i.e., PCT Int'l. Pat. Appl. Pub. No. WO 2006/072944, published Jul. 13, 2006, and concurrently filed PCT patent application, entitled: "Catalytically Treating Water Contaminated With Halogenated Organic Compounds", both by the present applicant (as cited and summarized hereinabove in the Background section).

The second category of properties, characteristics, behavior, and parameters, which is used for selection of the agrochemical (A) and of the at least one transforming agent (T), is associated with the at least one transforming agent (T) and the agrochemical (A) being capable of co-migrating and being co-distributed as much as possible throughout (permeable or porous) geological matter, in general, and (permeable or porous) sub-surface geological matter, in particular, (at temporally similar times, and at spatially similar depths) within 'water-containing' (i.e., partially or fully water saturated) types of sub-surface geological matter, following exposing an agricultural substrate to the composition [(A)/(T)] of the present invention.

Accordingly, the main objective of hereinbelow Example 2 was for studying the extent by which exemplary specific porphyrinogenic organometallic complex types of electron transfer mediators, as exemplary transforming agents (T), are partitioned (i.e., adsorbed-desorbed), and thus, migrate and move, (on/off) within and throughout exemplary specific forms of 'water-containing' (i.e., partially or fully water saturated) (permeable or porous) media (i.e., soil, clay) which represent actual types or components of geological matter, in general, and sub-surface geological matter, in particular.

Example 1

Catalytically Treating Water Contaminated with Endosulfan

According to Homogeneous Catalysis Via a Batch Mode

Several Different (Separate) Electron Transfer Mediator Catalysts, Titanium (III) Citrate Bulk Electron Donor Materials and Experimental Methods Water:
Distilled deionized filtered water, generated by a Milli-Q water purification system, was exclusively used throughout.

Endosulfan—Water Contaminant:
Endosulfan [$C_9H_6Cl_6O_3S$] (mixture of $\alpha$ and $\beta$ isomers thereof), "PESTANAL®, analytical standard", was obtained from Riedel de Haen.

Endosulfan Contaminated Water:
Stock solutions of water contaminated with endosulfan at a concentration of 0.32 mg endosulfan per liter water, corresponding to 0.32 ppm (parts per million) endosulfan in the contaminated water, were prepared by dissolving the appropriate quantity of the endosulfan in the distilled deionized filtered water.

Electron Transfer Mediator (homogeneous) Catalysts:
The (free base) porphyrins: (a) tetramethylpyridilporphyrin [5,10,15,20-tetrakis(1-methyl-4-pyridinio)-porphine] [TMPyP]; (b) tetrahydroxyphenylporphyrine [5,10,15,20-tetrakis(4-hydroxyphenyl)-21H,23H-porphine] [TP(OH)P]; and (c) 4,4',4'',4'''-(porphine-5,10,15,20-tetrayl)tetrakis(benzenesulfonic acid) [TBSP], were obtained from Aldrich; (d) protoporphyrin IX was obtained from Sigma; and (e) hematoporphyrin was obtained from Sigma-Aldrich.

The Metalloporphyrin Complexes:
(1) tetramethylpyridilporphyrin-Nickel [5,10,15,20-tetrakis(1-methyl-4-pyridinio)-porphine-Nickel] [TMPyP-Ni];
(2) tetramethylpyridilporphyrin-Cobalt [5,10,15,20-tetrakis(1-methyl-4-pyridinio)-porphine-Cobalt] [TMPyP-Co];
(3) tetramethylpyridilporphyrin-Iron [5,10,15,20-tetrakis(1-methyl-4-pyridinio)-porphine-Iron] [TMPyP-Fe];
(4) tetrahydroxyphenylporphyrine-Nickel [5,10,15,20-tetrakis(4-hydroxyphenyl)-21H,23H-porphine-Nickel] [TP(OH)P—Ni];
(5) tetrahydroxyphenylporphyrine-Cobalt [5,10,15,20-tetrakis(4-hydroxyphenyl)-21H,23H-porphine-Cobalt] [TP(OH)P—Co];

(6) 4,4',4'',4'''-(porphine-5,10,15,20-tetrayl)tetrakis(benzenesulfonic acid)-Nickel [TBSP-Ni];

(7) 4,4',4'',4'''-(porphine-5,10,15,20-tetrayl)tetrakis(benzenesulfonic acid)-Cobalt [TBSP-Co];

(8) hematoporphyrin-Cobalt; and (9) protoporphyrin IX-Cobalt, were synthesized from the respective [TMPyP], [TP(OH)P], [TBSP], hematoporphyrin, and protoporphyrin IX, (free base) porphyrins and transition metal solutions using published methods and techniques [26, 27, 28].

The metallocorrin complex, vitamin $B_{12}$ [corrin ligand (porphyrin analog) complexed to a cobalt (III) ion] (99% pure), as another type of specific porphyrinogenic organometallic complex, was obtained from Sigma.

Separate aqueous stock solutions of above listed [TMPyP] metalloporphyrin complexes (1), (2), and (3), at a concentration of 2 mM, were prepared by dissolving the respective synthesized metalloporphyrin complex in the distilled deionized filtered water at pH 5-9.

Separate aqueous stock solutions of above listed [TP(OH)P] metalloporphyrin complexes (4) and (5), at a concentration of 2 mM, were prepared by dissolving the respective synthesized metalloporphyrin complex in the distilled deionized filtered water previously adjusted to pH greater than 7.5 by adding analytical grade sodium hydroxide [NaOH] solution.

Separate aqueous stock solutions of the above listed [TBSP] metalloporphyrin complexes (6) and (7), at a concentration of 2 mM, were prepared by dissolving the respective synthesized metalloporphyrin complex in the distilled deionized filtered water previously adjusted to pH greater than 7 by adding analytical grade sodium hydroxide [NaOH] solution.

Separate aqueous stock solutions of above listed hematoporphyrin, and protoporphyrin IX, metalloporphyrin complexes (8), and (9), at a concentration of 2 mM, were prepared by dissolving the respective synthesized metalloporphyrin complex in the distilled deionized filtered water at pH 5-9.

A separate aqueous stock solution of above vitamin $B_{12}$ metallocorrin complex, at a concentration of 2 mM, was prepared by dissolving the metallocorrin complex in the distilled deionized filtered water at pH 5-9.

The preceding stock solutions were used in Example 1 for providing the respective metalloporphyrin complex, or metallocorrin complex, electron transfer mediator (homogeneous) catalyst.

Bulk Electron Donor or Reducing Agent:

Titanium (III) citrate [$Ti(OC(CH_2COOH)_2COOH$], in aqueous solution form, was synthesized, using published methods and techniques [29, 30]. The prepared solution of 250 mM titanium (III) citrate in 660 mM tris buffer (pH 8.2) was aliquoted to vials, which were sealed and stored at −20° C. until use.

Homogeneous Catalytic Batch Reactor (as an exemplary in-situ unit):

40 milliliter (0.04 liter) glass vials (usually filled with about 25 milliliters of reaction solution), fitted with Teflon®-clear silicon sealing cups, were used at room temperature (between about 20° C. and about 25° C.) and atmospheric pressure. Contents of each glass vial (batch reactor) were mixed by securing the glass vial onto an orbital shaker (model TS-600, from MRC, Israel) having automatic (mixing) speed control. Multiple replicates of each glass vial (batch reactor) filled with reaction solution were prepared at the beginning of an experiment.

The glass vial batch mode reaction systems were prepared under oxygen free atmosphere conditions, using an anaerobic chamber (Coy Laboratory Products, MI, USA) containing an oxygen free atmosphere composed of a mixture of nitrogen [N2] gas and hydrogen [H2] gas, having a 95/5 molar or partial pressure ratio.

Analytical Procedures:

GC/MS was used for monitoring concentration over time, of endosulfan (as α and β isomers) in the endosulfan contaminated water, during the batch mode homogeneous catalytic reactions.

The GC/MS was a Varian, Saturn 2000. The GC column used was a J&W Scientific—DB5 capillary column, 30 meter length, 0.25 mm inner diameter, and 0.25 micron film layer thickness. The GC program was: 200° C. for 3 minutes; temperature ramp of 6° C. per minute to 250° C.; hold for 18.7 minutes.

For the GC/MS analytical procedure, acquiring and preparing samples from the glass vial (batch reactor), and preparing standard reference samples, were done using the same anaerobic chamber described above. Time dependent samples were acquired from each catalytic reaction 'in-progress', and from identical repetitions of each such progressing catalytic reaction.

For each sampling point, the GC/MS analytical procedure included opening (thereby, sacrificing) at least two glass vials (batch reactors), followed by extracting the organic phase from the aqueous reaction solution contained in each glass vial using 5 milliliters of toluene [99.9%; Sigma-Aldrich] as extraction solvent. The extracted organic phase was then transferred to a gas chromatograph vial and analyzed for the presence of the endosulfan (as α and β isomers) contaminant.

Experimental Procedure

The reactions were performed at room temperature (between about 20° C. and about 25° C.) and atmospheric pressure.

A volume of 25 milliliter (0.025 liter) was taken from the appropriate stock solution of water contaminated with endosulfan and added to the empty 40 milliliter glass vial (batch reactor), for providing an initial concentration of 0.32 mg endosulfan per liter contaminated water, or 0.32 ppm endosulfan in the contaminated water. This procedure was repeated, for preparing at least two glass vials (batch reactors) for each experiment.

Reducing conditions were not naturally prevalent in the endosulfan contaminated water in the glass vials (batch reactors) for effectively enabling the phenomena, mechanisms, and processes of the electron transfer mediated (homogeneous) catalytic reductive dehalogenation of the endosulfan contaminant in the contaminated water. Thus, reducing conditions in the endosulfan contaminated water were anthropogenically produced by exposing the endosulfan contaminated water to titanium (III) citrate [$Ti(OC(CH_2COOH)_2COOH$] as the bulk electron donor or reducing agent, immediately before exposing the endosulfan contaminated water to the catalytically effective amount of each respective above stated metalloporphyrin complex, or metallocorrin complex, electron transfer mediator (homogeneous catalyst).

For this, a number of the (−20° C. stored) vials of the prepared solution of 250 mM titanium (III) citrate in 660 mM tris buffer (pH 8.2) were brought to room temperature.

Then, a volume of 1.8 milliliter was taken and added to the endosulfan contaminated water contained in each glass vial (batch reactor), for providing a concentration of about 0.0175 M titanium (III) citrate (bulk electron donor or reducing agent) in the endosulfan contaminated water. The pH of the solution was then adjusted to the desired value (e.g., 9.0) by adding small amounts of NaOH concentrated solution to each glass vial (batch reactor).

Then, an appropriate volume was taken from each respective above stated 2 mM metalloporphyrin complex, or metallocorrin complex, stock solution, and added to each glass vial (batch reactor) containing endosulfan contaminated water and titanium (III) citrate, for providing a concentration of about 0.010 mM metalloporphyrin complex, or metallocorrin complex, electron transfer mediator (homogeneous) catalyst in the endosulfan contaminated water. At this point, the glass vials were sealed, and transferred to the orbital shaker.

The contents, i.e., the endosulfan contaminated water containing the titanium (III) citrate as bulk electron donor or reducing agent and the metalloporphyrin complex, or metallocorrin complex, electron transfer mediator (homogeneous) catalyst, in each glass vial (batch reactor), were continuously mixed by securing each glass vial onto the orbital shaker set at a mixing speed of 150 rpm during the entire extent of time or duration of reaction.

For each metalloporphyrin complex, or metallocorrin complex, GC/MS analytical samples were prepared after 72 hours from each of at least two glass vials containing the endosulfan contaminated water of the batch mode homogeneous catalytic reductive dechlorination reaction. The organic phase was extracted from the aqueous reaction solution contained in each glass vial using 5 milliliters of toluene as extraction solvent.

The extracted organic phase was then analyzed for the presence of the endosulfan (α and β isomers) contaminant.

Experimental Results

The results obtained are presented in the following Table 2.

TABLE 2

Normalized concentration (%) of endosulfan (α and β isomers) measured after 72 hours of reaction, for the batch mode homogeneous catalytic reductive dechlorination reaction of endosulfan in contaminated water, separately effected by the above stated different (separate) metalloporphyrin complex, or metallocorrin complex, electron transfer mediator (homogeneous) catalysts, and the titanium (III) citrate as bulk electron donor or reducing agent, at room temperature and atmospheric pressure.

| Electron Transfer Mediator Catalyst | Normalized Endosulfan Concentration (%) | |
| --- | --- | --- |
| | α isomer | β isomer |
| (1) [TMPyP—Ni] | 0.0 | 0.0 |
| (2) [TMPyP—Co] | 1.2 | 0.0 |
| (3) [TMPyP—Fe] | 40.7 | 66.7 |
| (4) [TP(OH)P—Ni] | 8.3 | 9.3 |
| (5) [TP(OH)P—Co] | 8.3 | 12.3 |
| (6) [TBSP—Ni] | 1.3 | 0.0 |
| (7) [TBSP—Co] | 2.8 | 0.0 |
| (8) Hematoporphyrin-Co | 9.4 | 9.7 |
| (9) Protoporphyrin IX-Co | 31.5 | 37.8 |
| Vitamin $B_{12}$ | 4.6 | 14.3 |

The results presented in Table 2 show that in all cases, the endosulfan concentration dramatically decreased following 72 hours of the catalytic reaction. Endosulfan concentration in the endosulfan contaminated water decreased by more than about 90% in most cases, and in some cases, the endosulfan contaminant was practically completely degraded.

Example 2

Partitioning (Adsorption-Desorption) of Electron Transfer Mediators (Catalysts) (Transforming Agents) on/Off Different Geological Matter (Soil, Clay)

Materials and Experimental Methods

Water:
Distilled deionized filtered water, generated by a Milli-Q water purification system, was exclusively used throughout.

Electron Transfer Mediators (Homogeneous Catalysts) (Transforming Agents):
The electron transfer mediators, herein, conveniently abbreviated as (ETMs), used were metalloporphyrin complex, and metallocorrin complex, types of porphyrinogenic organometallic complexes. These electron transfer mediators represented different exemplary homogeneous catalysts which can function as exemplary transforming agents for implementing the hereinabove illustratively described invention.

The (free base) porphyrin, 4,4',4'',4'''-(porphine-5,10,15,20-tetrayl)tetrakis(benzenesulfonic acid) [TBSP], was obtained from Aldrich.

The (free base) porphyrin, hematoporphyrin, was obtained from Sigma-Aldrich.

The metalloporphyrin complexes (electron transfer mediators (ETMs)): 4,4',4'',4'''-(porphine-5,10,15,20-tetrayl)tetrakis(benzenesulfonic acid)-Nickel [TBSP-Ni]; and hematoporphyrin-Cobalt, were synthesized from the respective [TBSP], and hematoporphyrin, (free base) porphyrins and transition metal solutions using published methods and techniques [26, 27, 28].

The metallocorrin complex (electron transfer mediator (ETM)), vitamin $B_{12}$ [corrin ligand (porphyrin analog) complexed to a cobalt (III) ion] (99% pure), was obtained from Sigma.

A separate aqueous stock solution of the [TBSP-Ni] metalloporphyrin complex (ETM), at a concentration of 2 mM, was prepared by dissolving the synthesized [TBSP-Ni] metalloporphyrin complex in the distilled deionized filtered water previously adjusted to pH greater than 7 by adding analytical grade sodium hydroxide [NaOH] solution.

A separate aqueous stock solution of the hematoporphyrin-Cobalt metalloporphyrin complex (ETM), at a concentration of 2 mM, was prepared by dissolving the synthesized hematoporphyrin-Cobalt metalloporphyrin complex in the distilled deionized filtered water at pH 5-9.

A separate aqueous stock solution of the vitamin $B_{12}$ metallocorrin complex (ETM), at a concentration of 2 mM, was prepared by dissolving the vitamin $B_{12}$ metallocorrin complex in the distilled deionized filtered water at pH 5-9.

Types of Geological Matter:
Three soil and clay types of geological matter were used: Bet Dagan soil, kaolinite clay, and montmorillonite clay. Such exemplary types of geological matter, having varying degrees of permeability and porosity, represented different exemplary 'actual' types of geological matter, in general, and sub-surface geological matter, in particular, which are applicable for implementing the hereinabove illustratively described invention.

Bet Dagan soil was obtained from the site of the Bet Dagan Agricultural Research Organization campus, Bet Dagan, Israel. The Bet Dagan soil was sieved to a size of 60 mesh, and maintained in a dry air environment until use.

Kaolinite clay, 'purum, natural' grade, was obtained from Fluka.

Montmorillonite clay, 10-12% impurities, was obtained from Fluka.

Partitioning Vessel or Container:

40 milliliter (ml) (0.04 liter) glass vials (filled with 10 milliliters, of solution), were used at room temperature (between about 20° C. and about 25° C.) and atmospheric pressure, as the vessel or container, for containing the aqueous mixtures of the (partitioning) electron transfer mediator (ETM)—geological matter (soil or clay).

Separate glass vials were used as '(ETM) Controls', for containing same concentration samples of the prepared 2 mM metalloporphyrin complex, or metallocorrin complex, (ETM) aqueous stock solutions, 'absent' of any geological matter (soil or clay) solid phase. The purpose of preparing and testing the (ETM) Control solutions was to check and confirm that the electron transfer mediators (ETMs) were not partitioning along (i.e., adsorbing onto, desorbing off of) the (solid phase) walls of the glass vials, separate from, and independent of, partitioning within the geological matter (soil or clay) solid phase.

Mixing, Centrifugation:

Contents of each glass vial (partitioning vessel) were mixed by securing the glass vial onto an orbital shaker (model TS-600, from MRC, Israel) having automatic (mixing) speed control. Contents of each glass vial (partitioning vessel) were centrifuged by securing the glass vial in a centrifuge (Clay Adams instrument) having automatic (centrifugation) speed control.

Analytical Procedure:

Ultraviolet and visible (UV/VIS) absorption spectrometry was used for measuring and determining the quantity (concentration), after a time period of 10 days each of (ETM) adsorption and desorption, of each (partitioning) electron transfer mediator (ETM) in the aqueous (liquid) phase of each respective electron transfer mediator (ETM)—geological matter (soil or clay) aqueous mixture. Multiple samples of the aqueous (liquid) phase of each mixture were taken from each respective glass vial (partitioning vessel).

The UV/VIS absorption spectrometer was a Varian, Cary 100, operative according to double beam analysis. Concentrations of the [TBSP-Ni], hematoporphyrin-Cobalt, and vitamin $B_{12}$, electron transfer mediators (ETMs), were measured at absorption wavelengths of 527 nanometers (nm), 413 nanometers (nm), and 548 nanometers (nm), respectively.

The (UV/VIS) absorption spectrometry analytical procedure was also used for measuring and determining the quantity (concentration) of each electron transfer mediator (ETM) in the respective (ETM) Control solutions.

Experimental Procedure

The electron transfer mediator (ETM)—geological matter (soil or clay) partitioning experiments were performed at room temperature (between about 20° C. and about 25° C.) and atmospheric pressure.

Each prepared 2 mM metalloporphyrin complex, or metallocorrin complex, (ETM) aqueous stock solution, was diluted by a ratio of 1/10 or 1/100 with the distilled deionized filtered water, for forming respective diluted (ETM) stock solutions.

For each diluted (ETM) stock solution, corresponding to each respective electron transfer mediator (ETM), an amount of each type of geological matter, i.e., Bet Dagan soil, kaolinite clay, and montmorillonite clay, was weighed, and added to a separate glass vial (partitioning vessel). (ETM) Control solutions remained absent of any geological matter.

Then, a volume of 10 ml was taken from each respective metalloporphyrin complex, or metallocorrin complex, diluted (ETM) stock solution, and added to a respective glass vial (batch reactor) containing the weighed amount of the respective (soil or clay) type of geological matter, for forming a series of (nine) separate electron transfer mediator (ETM)—geological matter (soil or clay) aqueous mixtures, i.e., three different types of geological matter for each of the three different aqueous solutions of electron transfer mediators (ETMs) to be tested for partitioning (adsorption and desorption) therein.

The glass vials (partitioning vessels), containing the electron transfer mediator (ETM)—geological matter (soil or clay) aqueous mixtures, and the glass vials containing the (ETM) Control solutions, were sealed, and transferred to the orbital shaker.

Preceding preparation of the (partitioning) electron transfer mediator (ETM)-geological matter (soil or clay) aqueous mixtures, and contents thereof, are summarized in the following Table 3.

TABLE 3

Summary of the preparation and contents of the (partitioning) electron transfer mediator (ETM) - geological matter (soil or clay) aqueous mixtures.

| Electron Transfer Mediator (ETM) | Dilution Ratio of 2 mM (ETM) solution | Geological Matter (soil or clay) | Weight (grams) of geological matter mixed with diluted (ETM) solution |
|---|---|---|---|
| [TBSP-Ni] | 1/10 | Bet Dagan soil | 1.9326 |
|  | 1/10 | Kaolinite clay | 0.1991 |
|  | 1/10 | Montmorillonite clay | 0.1173 |
| Hematoporphyrin-Co | 1/100 | Bet Dagan soil | 0.2041 |
|  | 1/100 | Kaolinite clay | 0.2229 |
|  | 1/10 | Montmorillonite clay | 0.219 |
| Vitamin $B_{12}$ | 1/10 | Bet Dagan soil | 1.975 |
|  | 1/10 | Kaolinite clay | 1.9405 |
|  | 1/10 | Montmorillonite clay | 0.2121 |

The series of the separate electron transfer mediator (ETM)—geological matter (soil or clay) aqueous mixtures, contained in the glass vials (partitioning vessels), were mixed on the orbital shaker for 10 days. The (ETM) Control solutions were similarly mixed.

The objective here was to form an (ETM) 'adsorption mode' of each electron transfer mediator (ETM), by favoring and driving the electron transfer mediator (ETM) to leave the aqueous (liquid) phase and adsorb onto the geological matter (soil or clay) (solid) phase. The 10 day mixing period was to enable each electron transfer mediator (ETM)-geological matter (soil or clay) aqueous mixture to eventually approach as close as possible to an equilibrium state, i.e., adsorption—desorption equilibrium of the electron transfer mediator (ETM) equilibrating between the aqueous (liquid) phase and the geological matter (soil or clay) (solid) phase. Such equilibrium corresponds to the simultaneous and opposite processes of (1) the electron transfer mediator (ETM) leaving the aqueous (liquid) phase and adsorbing onto the geological matter (soil or clay) (solid) phase, and (2) desorbing off of the geological matter (soil or clay) (solid) phase, and entering the aqueous (liquid) phase.

Following completion of the 'adsorption mode' 10 day mixing (equilibrating) period, multiple analytical samples of the aqueous (liquid) phase of each electron transfer mediator (ETM)—geological matter (soil or clay) aqueous mixture were prepared from each respective glass vial (partitioning vessel).

The 'adsorption mode' analytical samples were then analyzed by the above described (UV/VIS) absorption spectrometry procedure, for determining the quantity (concentration) of the [TBSP-Ni], hematoporphyrin-Cobalt, and vitamin $B_{12}$, electron transfer mediator (ETM), present (i.e., remaining) in the aqueous (liquid) phase of each respective electron transfer mediator (ETM)—geological matter (soil or clay) aqueous mixture. Such analysis and determination corresponded to quantitatively measuring and determining the extent that the respective electron transfer mediator (ETM) left the aqueous (liquid) phase and 'adsorbed' onto the respective geological matter (soil or clay) (solid) phase. The (ETM) Control solutions were similarly analyzed.

Each of the separate electron transfer mediator (ETM)—geological matter (soil or clay) aqueous mixtures, contained in the glass vials (partitioning vessels), was then centrifuged in the centrifuge for 5 minutes.

The aqueous (liquid) phase of each (centrifuged) respective electron transfer mediator (ETM)—geological matter (soil or clay) aqueous mixture was then entirely replaced by a fresh new volume of 10 ml of the distilled deionized filtered water. The objective here was to form an (ETM) 'desorption mode' of each electron transfer mediator (ETM), by favoring and driving desorption of the electron transfer mediator (ETM) from the respective geological matter (soil or clay) (solid) phase (containing previously adsorbed electron transfer mediator (ETM)), and entering into the fresh new aqueous (liquid) phase.

The series of the 'desorption mode' separate electron transfer mediator (ETM)-geological matter (soil or clay) aqueous mixtures, contained in the glass vials (partitioning vessels), were then mixed on the orbital shaker for 10 days. As for the 10 day mixing period of the above performed 'adsorption mode', here, the 10 day mixing period was to enable each 'desorption mode' electron transfer mediator (ETM)—geological matter (soil or clay) aqueous mixture to eventually approach as close as possible to an equilibrium state, i.e., adsorption-desorption equilibrium of the electron transfer mediator (ETM) equilibrating between the aqueous (liquid) phase and the geological matter (soil or clay) (solid) phase.

Following completion of the 'desorption mode' 10 day mixing (equilibrating) period, multiple analytical samples of the aqueous (liquid) phase of each electron transfer mediator (ETM)—geological matter (soil or clay) aqueous mixture were prepared from each respective glass vial (partitioning vessel).

The 'desorption mode' analytical samples were then analyzed by the above described (UV/VIS) absorption spectrometry procedure, for determining the quantity (concentration) of the [TBSP-Ni], hematoporphyrin-Cobalt, and vitamin $B_{12}$, electron transfer mediator (ETM), present (i.e., which entered) in the aqueous (liquid) phase of each respective electron transfer mediator (ETM)—geological matter (soil or clay) aqueous mixture. Such analysis and determination corresponded to quantitatively measuring and determining the extent that the respective electron transfer mediator (ETM) 'desorbed' off of the geological matter (soil or clay) (solid) phase, and entered the respective aqueous (liquid) phase. The (ETM) Control solutions were similarly analyzed.

Experimental Results

The results obtained are presented in the following Table 4.

TABLE 4

Summary of the partitioning (adsorption and desorption) of the different electron transfer mediators (ETMs) on/off the different types of geological matter (soil, clay).

| Electron Transfer Mediator (ETM) | Geological Matter (soil or clay) | Adsorption (%) of (ETM) after 10 days | Desorption (%) of (ETM) after 10 days |
|---|---|---|---|
| [TBSP—Ni] | Bet Dagan soil | 71.68 ± 2.31 | 21.22 ± 2.55 |
| | Kaolinite clay | 59.44 ± 1.21 | 40.17 ± 5.51 |
| | Montmorillonite clay | 95.50 ± 0.44 | 8.57 ± 1.28 |
| Hematoporphyrin-Co | Bet Dagan soil | 12.80 ± 1.2 | 5.87 ± 0.32 |
| | Kaolinite clay | 45.28 ± 1.85 | 12.65 ± 0.67 |
| | Montmorillonite clay | 100 | 0 |
| Vitamin $B_{12}$ | Bet Dagan soil | 23.35 ± 0.1 | 19.87 ± 0.23 |
| | Kaolinite clay | 12.85 ± 0.03 | 12.85 ± 0.03 |
| | Montmorillonite clay | 100 | 0 |

The results presented in Table 4 show that adsorption of the metalloporphyrin complex, and metallocorrin complex, types of porphyrinogenic organometallic complexes, as exemplary electron transfer mediators (ETMs), onto the Bet Dagan soil and Kaolinite clay types of geological matter was partial. For these partitioning systems, a relatively large portion of each adsorbed electron transfer mediator (ETM) was desorbed back into the aqueous (liquid) phase of each respective electron transfer mediator (ETM)—geological matter (soil or clay) aqueous mixture. Such characteristics and behavior of these electron transfer mediator (ETM)—geological matter (soil or clay) aqueous mixture partitioning systems, indicates that in 'real or actual' soil or clay types of geological matter, one can expect to see transport of such electron transfer mediators (ETMs) (as exemplary homogeneous catalysts, and as exemplary transforming agents, for implementing the hereinabove illustratively described invention), accompanied by relatively low loss of the electron transfer mediators (ETMs) to the (soil or clay) types of geological matter.

The results presented in Table 4 also show that for the montmorillonite clay type of geological matter, there was relatively very strong adsorption, and nearly no desorption, of the metalloporphyrin complex, and metallocorrin complex, types of porphyrinogenic organometallic complexes, as exemplary electron transfer mediators (ETMs). This may indicate that for such types of electron transfer mediator (ETM)—geological matter (soil or clay) aqueous mixture partitioning systems, there is expected to be strong adsorption of these electron transfer mediators (ETMs) onto montmorillonite clay types of geological matter. Since montmorillonite clay is commonly known for strongly adsorbing agrochemicals, such characteristics and behavior exhibited, in Example 2, by the montmorillonite clay, provides for possibly enhancing or enabling a 'synchronization' of the transport of such electron transfer mediators (ETMs), functioning as exemplary transforming agents (T), and the contaminant agrochemical (A), for example, in the form of the composition [(A)/(T)] of the present invention, through the geological matter, in general, and through sub-surface geological matter, in particular.

It is appreciated that certain aspects and characteristics of the invention, which are, for clarity, described in the context of separate embodiments, may also be provided in combination in a single embodiment. Conversely, various aspects and characteristics of the invention, which are, for brevity, described in the context of a single embodiment, may also be provided separately or in any suitable sub-combination.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described in conjunction with specific embodiments and examples thereof, it is evident that many alternatives, modifications and variations will be apparent to those skilled in the art. Accordingly, it is intended to embrace all such alternatives, modifications and variations that fall within the scope of the appended claims.

BIBLIOGRAPHY

1. Chapter on 'Pesticide Classification', in 'The Compendium of Pesticide Common Names', in "Alan Wood's Website", at website address: http://www.alanwood.net/index.html (as hosted in the US) or at http://www.hclrss.co.uk (as hosted in the UK); last accessed Dec. 2, 2005.
2. Newman, A., *Environ. Sci. Technol.*, 29: 450A (1995).
3. Stammer, J. K., *J AWWA*, February, 76-85 (1996).
4. Plaflin, J. R. and Ziegler, E. N., *Encyclopedia of Environmental Science and Engineering*, 3rd Ed., Vol. 2, Gordon and Breach Science Publishers, Philadelphia (1992).
5. Schottler, S. P., et al., *Environ. Sci. Technol.*, 28:1079-1089 (1994).
6. Stamer, J. K. and Wieczorek, M. E., *J AWWA*, November, 79-86 (1996).
7. Thurman, E. M., et al., *Environ. Sci. Technol.*, 25: 1794-1796 (1991).
8. Thurman, E. M., et al., *Environ. Sci. Technol.*, 26: 2440-2447 (1992).
9. Holden, L. R., et al., *Environ. Sci. Technol.*, 26: 5, 935-943 (1992).
10. Potter, T. L. and Carpenter, T. L., *Environ. Sci. Technol.*, 29: 1557-1563 (1995).
11. Lerch, R. N., et al., *Environ. Sci. Technol.*, 29: 2759-2768 (1995).
12. Gruessner, B. and Watzin, M. C., *Environ. Sci. Technol.*, 29: 2806-2813 (1995).
13. Kolpin, D. W., et al. *Arch. Environ. Contam. Toxicol.*, 35: 3, 385-390 (1998).
14. Kolpin, D. W., et al., *Sci. Total Environ.*, 248: 2-3, 115-122 (2000).
15. Kolpin, D. W., et al., *Environ. Sci. Technol.*, 35: 6, 1217-1222 (2001).
16. Letterman, R. D. (ed.), Water Quality and Treatment: A Handbook of Community Water Supplies, 5th Ed., Amer. Water Works Assoc., McGraw-Hill, Inc., NY. (1999).
17. Montgomery, J. H., Agrochemicals Desk Reference: Environmental Data, Lewis Publishers, Chelsea, Mich. (1993).
18. EXTOXNET (Extension Toxicology Network), Oregon State University, http://llsulaco.oes.orst.edu: 7011 slextlextoxnetlpips (1993).
19. C&EN, "Call for investigation of Syngenta", Government Concentrates C&EN, 80(23) (2002).
20. C&EN, "Atrazine is not likely human carcinogen", Government Concentrates C&EN, 80(23) (2000).
21. http://www.organicconsumers.org/foodsafety/atrazine102703.cfm.
22. Miltner, R. J., et al., *J. AWWA*, January, 43-52 (1989).
23. Adams, C. D. and Randtke, S. J., *Environ. Sci. Technol.*, 26: 2218-2227 (1992).
24. Arnold, S. M., et al., *Environ. Sci. Technol.*, 29: 2083-2089 (1995).
25. Garrison, A. W., et al., "Phytodegradation of p,p'-DDT and the Enantiomers of o,p'-DDT", *Environ. Sci. Technol.*, 34: 1663-1670 (2000).
26. Dror, I. and Schlautman M., *Environ. Toxicol. Chem.*, 22: 525-533 (2003).
27. Fuhr, J. H. and Smith, K. M., "Laboratory Methods", in Porphyrins and Metalloporphyrins, Smith, K. M., editor, Elsevier, Amsterdam, The Netherlands, 757-869 (1975).
28. Warburg, O. and Negelein, E., *Biochemistry Z*, 244: 239-242 (1932).
29. Dror, I., et al., *Environ. Sci. Tech.*, 39: 1283-1290 (2005).
30. Smith, M. H. and Woods, S. L., *Appl. Envrion. Microbiol.*, 60: 4107-4110 (1994).

What is claimed is:

1. A method of decreasing or preventing sub-surface geological matter contamination resulting from exposing an agricultural substrate to an agrochemical, the method comprising:
    exposing the agricultural substrate to a composition which comprises the agrochemical and at least one transforming agent capable of decreasing or eliminating concentration of the agrochemical which contacts a sub-surface geological matter, thereby decreasing or preventing sub-surface geological matter contamination by the agrochemical,
    wherein:
    said at least one agrochemical comprises a halogenated organic pesticide; and
    said transforming agent is a porphyrinogenic organometallic complex, wherein said at least one agrochemical and said transforming agent are selected such that said transforming agent co-migrates and becomes co-distributed with said at least one agrochemical within and throughout said sub-surface geological matter, and wherein prior to entering said sub-surface geological matter, said at least one transforming agent exhibits no activity for said decreasing or eliminating concentration of said at least one agrochemical, and within said sub-surface geological matter, said at least one transforming agent exhibits activity for said decreasing or eliminating concentration of said at least one agrochemical which contacts said sub-surface geological matter, wherein said decreasing or eliminating concentration of said at least one agrochemical comprises reductive dehalogenation of said at least one agrochemical, and said reductive dehalogenation is effected under reducing conditions in said sub-surface geological matter and is not effected under oxidizing conditions of a top or uppermost surface layer of the ground or earth.

2. The method of claim 1, wherein the agricultural substrate is selected from the group consisting of plant matter and animal matter.

3. The method of claim 1, wherein said exposing is performed via an exposing medium within and through which said composition is applied or dispensed to, or/and upon, the agricultural substrate.

4. The method of claim 1, wherein said composition includes a plurality of agrochemicals.

5. The method of claim 1, wherein said pesticide is selected from the group consisting of acaricides, miticides, algicides, antifeedants, avicides, bactericides, bird repellants, chemosterilants, fungicides, herbicide safeners, herbicides, insect attractants, insect repellants, insecticides, mammal repellants, mating disrupters, molluscicides, nematicides, plant activators, plant growth regulators, rodenticides, synergists, and virucides, and any combination thereof.

6. The method of claim 1, wherein said porphyrinogenic organometallic complex is selected from the group consisting of a metalloporphyrin complex, a metallocorrin complex, a metallochlorin complex, and any combination thereof.

7. The method of claim 6, wherein said metalloporphyrin complex is composed of a transition metal complexed to an initially free base porphyrin selected from the group consisting of:

tetramethylpyridilporphyrin [5,10,15,20-tetrakis(1-methyl-4-pyridinio)-porphine] [TMPyP];
tetrahydroxyphenylporphyrine [5,10,15,20-tetrakis(4-hydroxyphenyl)-21H,23H-porphine] [TP(OH)P];
tetraphenylporphyrin [5,10,15,20-tetraphenyl-21H, 23H-porphine] [TPP];
4,4',4'',4'''-(porphine-5,10,15,20-tetrayl)tetrakis(benzenesulfonic acid) [TBSP];
hematoporphyrin; and
protoporphyrin IX.

8. The method of claim 6, wherein said metalloporphyrin complex is selected from the group consisting of:

tetramethylpyridilporphyrin-Nickel [5,10,15,20-tetrakis(1-methyl-4-pyridinio)-porphine-Nickel] [TMPyP-Ni];
tetramethylpyridilporphyrin-Cobalt [5,10,15,20-tetrakis(1-methyl-4-pyridinio)-porphine-Cobalt] [TMPyP-Co];
tetramethylpyridilporphyrin-Iron [5,10,15,20-tetrakis(1-methyl-4-pyridinio)-porphine-Iron] [TMPyP-Fe];
tetrahydroxyphenylporphyrine-Nickel [5,10,15,20-tetrakis(4-hydroxyphenyl)-21H, 23H-porphine-Nickel] [TP(OH)P—Ni];
tetrahydroxyphenylporphyrine-Cobalt [5,10,15,20-tetrakis(4-hydroxyphenyl)-21H, 23H-porphine-Cobalt] [TP(OH)P—Co];
4,4',4'',4'''-(porphine-5,10,15,20-tetrayl)tetrakis(benzenesulfonic acid)-Nickel [TBSP-Ni];
4,4',4'',4'''-(porphine-5,10,15,20-tetrayl)tetrakis(benzenesulfonic acid)-Cobalt [TBSP-Co];
hematoporphyrin-Cobalt;
protoporphyrin IX-Cobalt; and a combination thereof.

9. The method of claim 6, wherein said metalloporphyrin complex is selected from the group consisting of a chlorophyll and a heme.

10. The method of claim 6, wherein said metallocorrin complex is vitamin $B_{12}$.

11. The method of claim 1, wherein said sub-surface geological matter exists in a form selected from the group consisting of ground or earth, water, and any combination thereof.

12. A composition comprising at least one agrochemical and at least one transforming agent capable of decreasing or eliminating concentration of said at least one agrochemical in a sub-surface geological matter wherein:
said at least one agrochemical comprises a halogenated organic pesticide; and
said transforming agent is a porphyrinogenic organometallic complex, wherein said at least one agrochemical and said transforming agent are selected such that at least one transforming agent co-migrates and becomes co-distributed with said at least one agrochemical within and throughout said sub-surface geological matter, and wherein said at least one agrochemical and said transforming agent are selected such that prior to entering said sub-surface geological matter, said at least one transforming agent exhibits no activity for said decreasing or eliminating concentration of said at least one agrochemical, and within said sub-surface geological matter, said at least one transforming agent exhibits activity for said decreasing or eliminating concentration of said at least one agrochemical which contacts said sub-surface geological matter, wherein said decreasing or eliminating concentration of said at least one agrochemical comprises reductive dehalogenation of said at least one agrochemical, and said reductive dehalogenation is effected under reducing conditions in said sub-surface geological matter and is not effected under oxidizing conditions of a top or uppermost surface layer of the ground or earth.

13. The composition of claim 12, wherein said pesticide is selected from the group consisting of acaricides, miticides, algicides, antifeedants, avicides, bactericides, bird repellants, chemosterilants, fungicides, herbicide safeners, herbicides, insect attractants, insect repellants, insecticides, mammal repellants, mating disrupters, molluscicides, nematicides, plant activators, plant growth regulators, rodenticides, synergists, and virucides, and any combination thereof.

14. The composition of claim 12, wherein said porphyrinogenic organometallic complex is selected from the group consisting of a metalloporphyrin complex, a metallocorrin complex, a metallochlorin complex, and any combination thereof.

15. The composition of claim 14, wherein said metalloporphyrin complex is composed of a transition metal complexed to a (initially free base) porphyrin selected from the group consisting of:
tetramethylpyridilporphyrin [5,10,15,20-tetrakis(1-methyl-4-pyridinio)-porphine] [TMPyP];
tetrahydroxyphenylporphyrine [5,10,15,20-tetrakis(4-hydroxyphenyl)-21H, 23H-porphine] [TP(OH)P];
tetraphenylporphyrin [5,10,15,20-tetraphenyl-21H, 23H-porphine] [TPP];
4,4',4'',4'''-(porphine-5,10,15,20-tetrayl)tetrakis(benzenesulfonic acid) [TBSP];
hematoporphyrin; and
protoporphyrin IX.

16. The composition of claim 14, wherein said metalloporphyrin complex is selected from the group consisting of:
tetramethylpyridilporphyrin-Nickel [5,10,15,20-tetrakis(1-methyl-4-pyridinio)-porphine-Nickel] [TMPyP-Ni];
tetramethylpyridilporphyrin-Cobalt [5,10,15,20-tetrakis(1-methyl-4-pyridinio)-porphine-Cobalt] [TMPyP-Co];
tetramethylpyridilporphyrin-Iron [5,10,15,20-tetrakis(1-methyl-4-pyridinio)-porphine-Iron] [TMPyP-Fe];
tetrahydroxyphenylporphyrine-Nickel [5,10,15,20-tetrakis(4-hydroxyphenyl)-21H, 23H-porphine-Nickel] [TP(OH)P—Ni];
tetrahydroxyphenylporphyrine-Cobalt [5,10,15,20-tetrakis(4-hydroxyphenyl)-21H, 23H-porphine-Cobalt] [TP(OH)P—Co];
4,4',4'',4'''-(porphine-5,10,15,20-tetrayl)tetrakis(benzenesulfonic acid)-Nickel [TBSP-Ni];
4,4',4'',4'''-(porphine-5,10,15,20-tetrayl)tetrakis(benzenesulfonic acid)-Cobalt [TBSP-Co];
hematoporphyrin-Cobalt;
protoporphyrin IX-Cobalt; and a combination thereof.

17. The composition of claim 14, wherein said metalloporphyrin complex is selected from the group consisting of a chlorophyll and a heme.

18. The composition of claim 14, wherein said metallocorrin complex is vitamin $B_{12}$.

19. The composition of claim 12, wherein said sub-surface geological matter exists in a form selected from the group consisting of ground or earth, water, and any combination thereof.

20. An article-of-manufacture comprising a packaging material and the composition of claim 12 being contained within said packaging material, the composition being identified for exposing an agricultural substrate to the agrochemical such that sub-surface geological matter contamination by the agrochemical is decreased or prevented.

21. A method of decreasing or preventing sub-surface geological matter contamination resulting from exposing an agricultural substrate to an agrochemical, the method comprising:
exposing the agricultural substrate to a composition which comprises the agrochemical and at least one transforming agent capable of decreasing or eliminating concentration of the agrochemical which contacts a sub-surface geological matter, wherein:
said agrochemical comprises a halogenated organic pesticide; and
said at least one transforming agent is a porphyrinogenic organometallic complex composed of a transition metal complexed to a porphyrin selected from the group consisting of:
tetramethylpyridilporphyrin [5,10,15,20-tetrakis(1-methyl-4-pyridinio)-porphine] [TMPyP];
tetrahydroxyphenylporphyrine [5,10,15,20-tetrakis(4-hydroxyphenyl)-21H, 23H-porphine] [TP(OH)P];
tetraphenylporphyrin [5,10,15,20-tetraphenyl-21H, 23H-porphine] [TPP];
4,4',4'',4'''-(porphine-5,10,15,20-tetrayl)tetrakis(benzenesulfonic acid) [TBSP];
hematoporphyrin; and
protoporphyrin IX,
wherein said at least one agrochemical and said transforming agent are selected such that at least one transforming agent co-migrates and becomes co-distributed with said at least one agrochemical within and throughout said sub-surface geological matter,
wherein said decreasing or eliminating concentration of said at least one agrochemical comprises reductive dehalogenation of said at least one agrochemical, and said reductive dehalogenation is effected under reducing conditions in said sub-surface geological matter and is not effected under oxidizing conditions of a top or uppermost surface layer of the ground or earth,
thereby decreasing or preventing sub-surface geological matter contamination by the agrochemical.

22. The method of claim 21, wherein said pesticide is selected from the group consisting of acaricides, miticides, algicides, antifeedants, avicides, bactericides, bird repellants, chemosterilants, fungicides, herbicide safeners, herbicides, insect attractants, insect repellants, insecticides, mammal repellants, mating disrupters, molluscicides, nematicides, plant activators, plant growth regulators, rodenticides, synergists, and virucides, and any combination thereof.

23. The method of claim 21, wherein prior to entering said sub-surface geological matter, said at least one transforming agent exhibits no activity for said decreasing or eliminating concentration of the agrochemical.

24. The method of claim 21, wherein within said sub-surface geological matter, said at least one transforming agent exhibits activity for said decreasing or eliminating concentration of the agrochemical which contacts said sub-surface geological matter.

25. The method of claim 21, wherein said metalloporphyrin complex is selected from the group consisting of:
tetramethylpyridilporphyrin-Nickel [5,10,15,20-tetrakis(1-methyl-4-pyridinio)-porphine-Nickel] [TMPyP-Ni];
tetramethylpyridilporphyrin-Cobalt [5,10,15,20-tetrakis(1-methyl-4-pyridinio)-porphine-Cobalt] [TMPyP-Co];
tetramethylpyridilporphyrin-Iron [5,10,15,20-tetrakis(1-methyl-4-pyridinio)-porphine-Iron] [TMPyP-Fe];
tetrahydroxyphenylporphyrine-Nickel [5,10,15,20-tetrakis(4-hydroxyphenyl)-21H, 23H-porphine-Nickel] [TP(OH)P—Ni];
tetrahydroxyphenylporphyrine-Cobalt [5,10,15,20-tetrakis(4-hydroxyphenyl)-21H, 23H-porphine-Cobalt] [TP(OH)P—Co];
4,4',4'',4'''-(porphine-5,10,15,20-tetrayl)tetrakis(benzenesulfonic acid)-Nickel [TBSP-Ni];
4,4',4'',4'''-(porphine-5,10,15,20-tetrayl)tetrakis(benzenesulfonic acid)-Cobalt [TBSP-Co];
hematoporphyrin-Cobalt;
protoporphyrin IX-Cobalt; and a combination thereof.

26. The method of claim 21, wherein said sub-surface geological matter exists in a form selected from the group consisting of ground or earth, water, and any combination thereof.

27. A composition comprising at least one agrochemical and at least one transforming agent capable of decreasing or eliminating concentration of said at least one agrochemical in a sub-surface geological matter, said at least one agrochemical comprising a halogenated organic pesticide and said at least one transforming agent being a porphyrinogenic organometallic complex composed of a transition metal complexed to a porphyrin selected from the group consisting of:

tetramethylpyridilporphyrin [5,10,15,20-tetrakis(1-methyl-4-pyridinio)-porphine] [TMPyP];

tetrahydroxyphenylporphyrine [5,10,15,20-tetrakis(4-hydroxyphenyl)-21H, 23H-porphine] [TP(OH)P];

tetraphenylporphyrin [5,10,15,20-tetraphenyl-21H, 23H-porphine] [TPP];

4,4',4'',4'''-(porphine-5,10,15,20-tetrayl)tetrakis(benzenesulfonic acid) [TBSP];

hematoporphyrin; and protoporphyrin IX, wherein said at least one agrochemical and said transforming agent are selected such that at least one transforming agent co-migrates and becomes co-distributed with said at least one agrochemical within and throughout said sub-surface geological matter, and wherein said decreasing or eliminating concentration of said at least one agrochemical comprises reductive dehalogenation of said at least one agrochemical, and wherein said at least one agrochemical and said transforming agent are selected such that said reductive dehalogenation is effected under reducing conditions in said sub-surface geological matter and is not effected under oxidizing conditions of a top or uppermost surface layer of the ground or earth, thereby decreasing or preventing sub-surface geological matter contamination by the agrochemical.

28. The composition of claim 27, wherein said pesticide is selected from the group consisting of acaricides, miticides, algicides, antifeedants, avicides, bactericides, bird repellants, chemosterilants, fungicides, herbicide safeners, herbicides, insect attractants, insect repellants, insecticides, mammal repellants, mating disrupters, molluscicides, nematicides, plant activators, plant growth regulators, rodenticides, synergists, and virucides, and any combination thereof.

29. The composition of claim 27, wherein said at least one agrochemical and said transforming agent are selected such that prior to entering said sub-surface geological matter, said transforming agent exhibits no activity for said decreasing or eliminating concentration of the agrochemical.

30. The composition of claim 27, wherein said at least one agrochemical and said transforming agent are selected such that within said sub-surface geological matter, said at least one transforming agent exhibits activity for said decreasing or eliminating concentration of said at least one agrochemical which contacts said sub-surface geological matter.

31. The composition of claim 27, wherein said metalloporphyrin complex is selected from the group consisting of:

tetramethylpyridilporphyrin-Nickel [5,10,15,20-tetrakis(1-methyl-4-pyridinio)-porphine-Nickel] [TMPyP-Ni];

tetramethylpyridilporphyrin-Cobalt [5,10,15,20-tetrakis(1-methyl-4-pyridinio)-porphine-Cobalt] [TMPyP-Co];

tetramethylpyridilporphyrin-Iron [5,10,15,20-tetrakis(1-methyl-4-pyridinio)-porphine-Iron] [TMPyP-Fe];

tetrahydroxyphenylporphyrine-Nickel [5,10,15,20-tetrakis(4-hydroxyphenyl)-21H, 23H-porphine-Nickel] [TP(OH)P—Ni];

tetrahydroxyphenylporphyrine-Cobalt [5,10,15,20-tetrakis(4-hydroxyphenyl)-21H, 23H-porphine-Cobalt] [TP(OH)P—Co];

4,4',4'',4'''-(porphine-5,10,15,20-tetrayl)tetrakis(benzenesulfonic acid)-Nickel [TBSP-Ni];

4,4',4'',4'''-(porphine-5,10,15,20-tetrayl)tetrakis(benzenesulfonic acid)-Cobalt [TBSP-Co];

hematoporphyrin-Cobalt;

protoporphyrin IX-Cobalt; and a combination thereof.

32. An article-of-manufacture comprising a packaging material and the composition of claim 27 being contained within said packaging material, the composition being identified for exposing an agricultural substrate to the agrochemical such that sub-surface geological matter contamination by the agrochemical is decreased or prevented.

33. The method of claim 1, wherein said at least one transforming agent and said agrochemical have a similar distribution or partition coefficient, $K_d$.

34. The composition of claim 12, wherein said at least one transforming agent and said agrochemical have a similar distribution or partition coefficient, $K_d$.

35. The method of claim 21, wherein said at least one transforming agent and said agrochemical have a similar distribution or partition coefficient, $K_d$.

36. The composition of claim 27, wherein said at least one transforming agent and said agrochemical have a similar distribution or partition coefficient, $K_d$.

* * * * *